United States Patent
Harmanci et al.

(10) Patent No.: US 7,577,272 B2
(45) Date of Patent: Aug. 18, 2009

(54) DIGITAL FINGERPRINTING USING SYNCHRONIZATION MARKS AND WATERMARKS

(75) Inventors: Oztan Harmanci, Rochester, NY (US); Mehmet Kivanc Mihcak, Redmond, WA (US); Vishal Monga, San Antonio, TX (US)

(73) Assignee: Microsoft Corporation, Redmond, WA (US)

( * ) Notice: Subject to any disclaimer, the term of this patent is extended or adjusted under 35 U.S.C. 154(b) by 654 days.

(21) Appl. No.: 11/290,134

(22) Filed: Nov. 30, 2005

(65) Prior Publication Data

US 2007/0121997 A1 May 31, 2007

(51) Int. Cl.
G06K 9/00 (2006.01)
H04L 9/32 (2006.01)
H04N 1/40 (2006.01)

(52) U.S. Cl. .................. 382/100; 713/176; 358/3.28

(58) Field of Classification Search .................. None
See application file for complete search history.

(56) References Cited

U.S. PATENT DOCUMENTS 7,246,234 B1 * 7/2007 Ishiguro et al. ............. 713/168

OTHER PUBLICATIONS

Alghoniemy et al., "Geometric distortion correction in image watermarking," Proc. SPIE Symp. on Electronic Imaging, pp. 82-89, Jan. 2000.

Bas et al., "Geometrically invariant watermarking using feature points," IEEE Trans. on Image Processing, vol. 11, pp. 1014-1028, Sep. 2002.
Cox et al., "Digital Watermarking", Morgan Kauffman, 2001.
Cox et al., "Secure spread spectrum watermarking for multimedia", IEEE Trans. on Image Processing, vol. 6, No. 12, pp. 243-246, 1996.
Delanay et al., "Generalized 2-d cyclic patterns for secret watermark generation," Proc. IEEE Conf. on Image Processing, pp. 77-80, Sep. 2000.
Duric et al., "Recovering watermarks from images," Information and Software Engineering Technical Report, Apr. 1999.
"Fair Evaluation procedures for watermarking systems," http://www.petitcolas.net/fabien/watermarking/strimark, 2000.
Fridrich et al., "Robust hash functions for digital watermarking," Proc. IEEE International Conf. on Information technology: Coding and Computing, pp. 178-183, Mar. 2000.
Harmanci et al., "Geometrically Invariant Image Watermarking Via Robust Perceptual Hashes," Aug. 2005.
Kalker et al., "A video watermarking system for broadcast monitoring," Proc. SPIE Symp. on Electronic Imaging, pp. 103-112, Jan. 1998.

(Continued)

*Primary Examiner*—Charles Kim
(74) *Attorney, Agent, or Firm*—Lee & Hayes, PLLC

(57) ABSTRACT

Digital fingerprinting using synchronization marks and watermarks. At a watermark embedder, an input host signal is divided into regions, and a subset of the regions is selected to receive synchronization marks. Respective synchronization marks are then embedded into the selected regions. At a receiver, an input signal is divided into regions, and a subset of the regions is synchronized with additional regions, which were defined by the embedder when producing the signal that is input to the receiver. Also, the receiver can model any geometric distortion undergone by the input signal between the embedder and the receiver.

8 Claims, 18 Drawing Sheets

OTHER PUBLICATIONS

Kutter, "Watermarking resistant to translation, rotation and scaling," Proc. SPIE Multimedia Systems and Applications, vol. 3528, pp. 423-431, Nov. 1998.

Lin et al., "A robust image authentication system distinguishing JPEG compression from malicious manipulation," IEEE Trans. on Circuits and Systems for Video Technology, vol. 11, pp. 153-168, Feb. 2001.

Lin et al., "Rotation, scale, and translation resilient public watermarking for images," IEEE Trans. on Image Processing, vol. 10, pp. 767-782, May 2001.

Mihcak et al., "New iterative geometric techniques for robust image hashing," Proc. ACM Workshop on Security and Privacy in Digital Rights Management Workshop, pp. 13-21, Nov. 2001.

Mihcak et al., "Watermarking via optimization algorithms for quantizing randomized semi-global image statistics," AMC Mulitmedia Systems Journal, Apr. 2005.

Monga et al., "Robust perceptual image hashing feature points," Proc. IEEE Conf. on Image Processing, Oct. 2004.

Pereira et al., "Fast robust template matching for affine resistant watermarking," Int. Workshop on Information Hiding, Lecture Notes in Computer Science, vol. 1768, pp. 200-210, 1999.

Petitcolas et al., "Evaluation of copyright marking systems," Proc. IEEE Int. Conf. on Multimedia Systems, pp. 574-579, 1999.

Petitcolas, "Stirmark Benchmark 4.0," http://www.petitcolas.net/fabien/watermarking/stirmark/, Feb. 2005.

Podilchuk et al., "Image-adaptive watermarking using visual models," IEEE Journal on selected areas in communications, pp. 525-539, 1998.

Poor et al., "An Introduction to Signal Detection and Estimation", Springer-Verlag, 1994.

Ruanaidh et al., "Rotation, scale and translation invariant spread spectrum image watermarking," Signal Processing: Imag. Comm., vol. 66, pp. 303-317, May 1998.

Sun et al., "Recovering modified watermarking image with reference to original image," Proc. SPIE Symp. on Electronic Imaging, pp. 415-424, Jan. 1999.

Venkatesan et al., "Robust image hashing", Proc. IEEE Conf. on Image Processing, pp. 664-666, Sep. 2000.

Voloshynovskiy et al., "Watermark template attack," Proc. SPIE Annu. Symposium on Electronic Imaging, Jan. 2001.

Xie et al., "A class of authentication digital watermarks for secure multimedia communication," IEEE Trans. on Image Processing, vol. 10, No. 11, pp. 1754-1764, 2001.

Yeung et al., "An invisible watermarking scheme for image verification," Proc. IEEE Conf. on Image Processing, vol. 2, pp. 26-29, Pct. 1997.

* cited by examiner

800

DIGITAL FINGERPRINTING USING SYNCHRONIZATION MARKS AND WATERMARKS

BACKGROUND

Piracy is an increasing problem faced by video and image content owners, such as companies that produce, market, and distribute motion pictures, as well as artists, photographers, or the like. In some instances, the piracy takes the form of unauthorized downloading, duplication, or leaking of video or image content, whether voluntary or not. In other instances, piracy takes the form of unauthorized adaptation, editing, or other transformation of the video or image content.

To combat piracy, digital watermarking schemes have been introduced. Digital watermarking involves altering a digital representation of the video or image content. Typically, this alteration is not perceptible to the human eye. The digital watermark can serve as a digital "fingerprint" that associates a given person with a given copy of the content. Should this copy of the content be compromised afterwards, the "fingerprint" may facilitate forensic analysis of the compromised content. Also, the digital watermark can support authentication functions, such as ensuring that a given media player can play the content only if the content is properly licensed. For example, when a person obtains a license to play given content, the licensee may be provided a copy of the content with a watermark embedded therein. Afterwards, when the licensee wishes to play the content on a media player equipped with a watermark detector, the media player can test the content to see if the watermark is embedded therein. If the watermark is present and intact, the content is probably authentic and is played. Otherwise, the media player can reject the content.

In response to these watermarking schemes, content pirates have devised attacks against watermarked video or image content that are designed to undermine, defeat, or destroy the watermarks. These attacks may also be designed to fool the watermark detector. For example, a dishonest licensee may wish to defeat the watermark on his or her licensed copy of the content, so as to defeat the forensic function of the watermark. Then, the dishonest licensee could distribute the "unwatermarked" copy of the content without the copy being traceable back to him or her. The same motivation may apply to a person who is not a licensee.

SUMMARY

Systems and/or methods ("tools") are described that enable digital fingerprinting using synchronization marks and watermarks, and other techniques. Some of these techniques may be enabled with a data structure as described herein, as well as computer-readable media related to the same.

At a watermark embedder, an input host signal is divided into regions, and a subset of the regions is selected to receive synchronization marks. Respective synchronization marks are then embedded into the selected regions. At a receiver, an input signal is divided into regions, and a subset of the regions is synchronized with additional regions, which were defined by the embedder when producing the signal that is input to the receiver. Also, the receiver can model any geometric distortion undergone by the input signal between the embedder and the receiver.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

The following document describes system(s) and/or method(s) ("tools") capable of many techniques, which enable, in some embodiments, digital fingerprinting using synchronization marks and watermarks. For convenience, the description is organized generally as follows, as indicated by appropriate headings. An Overview is provided in connection with FIG. 1, introducing the embedder and receiver components. The embedder is then described in detail in connection with FIGS. 1-10. The receiver is then described in detail in connection with FIGS. 11-17. Finally, an overall operating or computing environment suitable for implementing the teachings herein is described in connection with FIG. 18.

Overview

Figure 1:
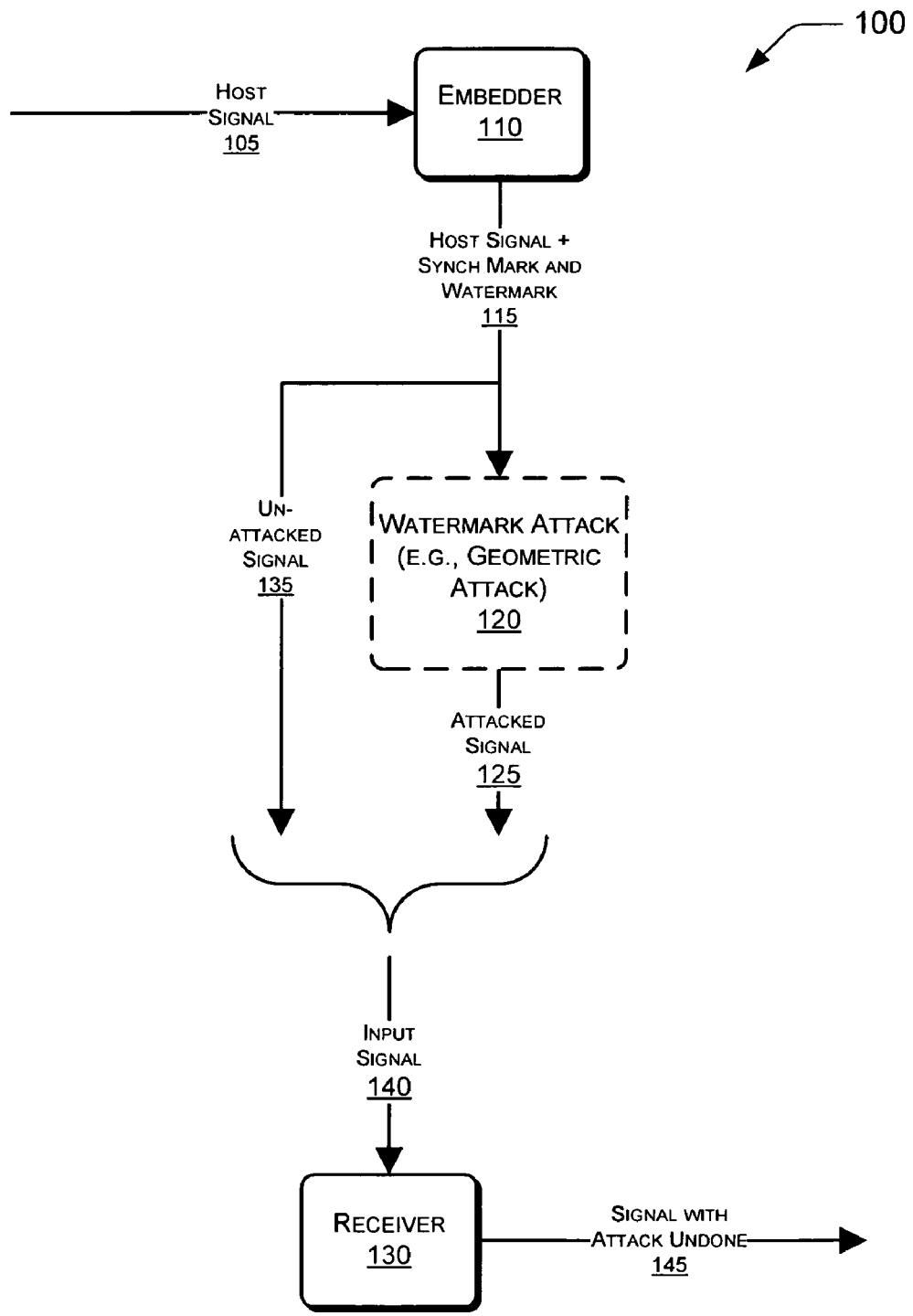
FIG. 1 is a block diagram illustrating an architecture for embedding synch marks and watermarks on an input host signal, and for undoing attacks on the watermarked signal.

FIG. 1 illustrates an architecture 100 for performing watermarking on an input host signal 105. The host signal 105 can take various forms in different implementations of the architecture 100. In illustrative but non-limiting examples, the host signal 105 may be a photographic image, a frame that is "grabbed" or otherwise captured from a motion picture, animated feature, or other type of video content.

The host signal 105 is received by a watermark embedder 110, which is operative to embed or encode a watermark signal and one or more synchronization marks (hereinafter, "synch marks" for convenience) into the host signal 105, producing an output signal 115. The output signal 115 generally represents the host signal 105 (e.g., an image or video) after the latter has been embedded with watermark(s) and/or synch mark(s). Illustrative architecture and related processes for embedding the synch marks and watermarks are described in further detail below.

Block 120 represents a process by which the output signal 115 may undergo an attack. Such an attack may take the form of, for example, a geometric attack. Recall that the output signal 115 can contain a watermark. In a geometric attack, an attacker attempts to defeat, remove, or otherwise render the watermark ineffective. More particularly, the attacker may obtain a copy of the output signal 115 and edit it in some manner, such that the edits are not readily perceptible to a human viewer of the output signal. However, these edits may nevertheless frustrate or defeat any watermarks embedded in the output signal 115. Examples of such edits might include scaling the output signal 115 in one or more dimensions, rotating the output signal 115 in whole or in part, or translating the output signal 115 in whole or in part. In addition, the attacker may perform one or more of these edits on the output signal 115.

As discussed in further detail below, the architecture 100 and related processes described herein enable such geometric attacks to be detected and undone. Therefore, host signals 105 that are watermarked by the embedder 110 to produce output signals 115 may be robust against such geometric attacks, so that the watermark(s) embedded in the output signals 115 are operative despite the efforts of the attacker.

Block 120 is shown in dashed outline to indicate that it is not to be considered as part of the architecture 100, but is nevertheless included in FIG. 1 to facilitate a full discussion of an illustrative environment in which the architecture 100 may operate. In instances where the output signal 115 undergoes some form of attack, an "attacked" version of the output signal 115 may pass to a receiver 130. The output signal 115 as it would stand after the attack is represented generally in FIG. 1 as attacked signal 125.

It is understood, however, that not all output signals 115 produced by all implementations of the embedder 110 may undergo attack. In such instances, the block 120 is bypassed and the receiver 130 receives the output signal 115 in substantially the same form as output by the embedder 110. In FIG. 1, this latter scenario is generally represented by an un-attacked signal 135 being presented to the receiver 130.

The receiver 130 is operative to receive the "attacked" signal 125 or the un-attacked signal 135. For convenience of illustration and discussion, the attacked signal 125 and the un-attacked signal 135 are represented collectively as a signal 140 that is input into the receiver 130. From the standpoint of the receiver 130, the receiver 130 does not initially "know" whether the input signal 140 has undergone a geometric or other attack. Put differently, having received an input signal 140, the receiver 130 does not immediately know whether the input signal 140 is an attacked signal 125 or an un-attacked signal 135. Accordingly, one function of the receiver 130 is to detect whether its input signal 140 has been attacked, and if so, to undo the attack to enable analysis of the watermark(s) that was embedded by the embedder 110.

In FIG. 1, one illustrative output of the receiver 130 is represented generally as a signal 145. The data represented by the output signal 145 can vary in different implementations of the architecture 100. In some implementations of the architecture 100, the receiver 130 may be configured only to undo attacks on its input signal 140, and to leave watermark extraction and processing to one or more other components. In such implementations, the receiver 130 may output a signal 145 that represents the input signal 140 with any attacks undone. One or more other components can then receive this signal 145, and extract and process any watermarks therefrom.

In other implementations of the architecture 100, the receiver 130 may be configured not only to undo attacks on its input signal 140, but also to extract and process any watermark(s) embedded by the embedder 110. In such implementations, the receiver 130 may output a signal 145 that represents the results of this watermark detection.

Having provided the above overview, the embedder 110 is now described in more detail, along with related components and processes.

Embedded Component and Processes

Figure 2:
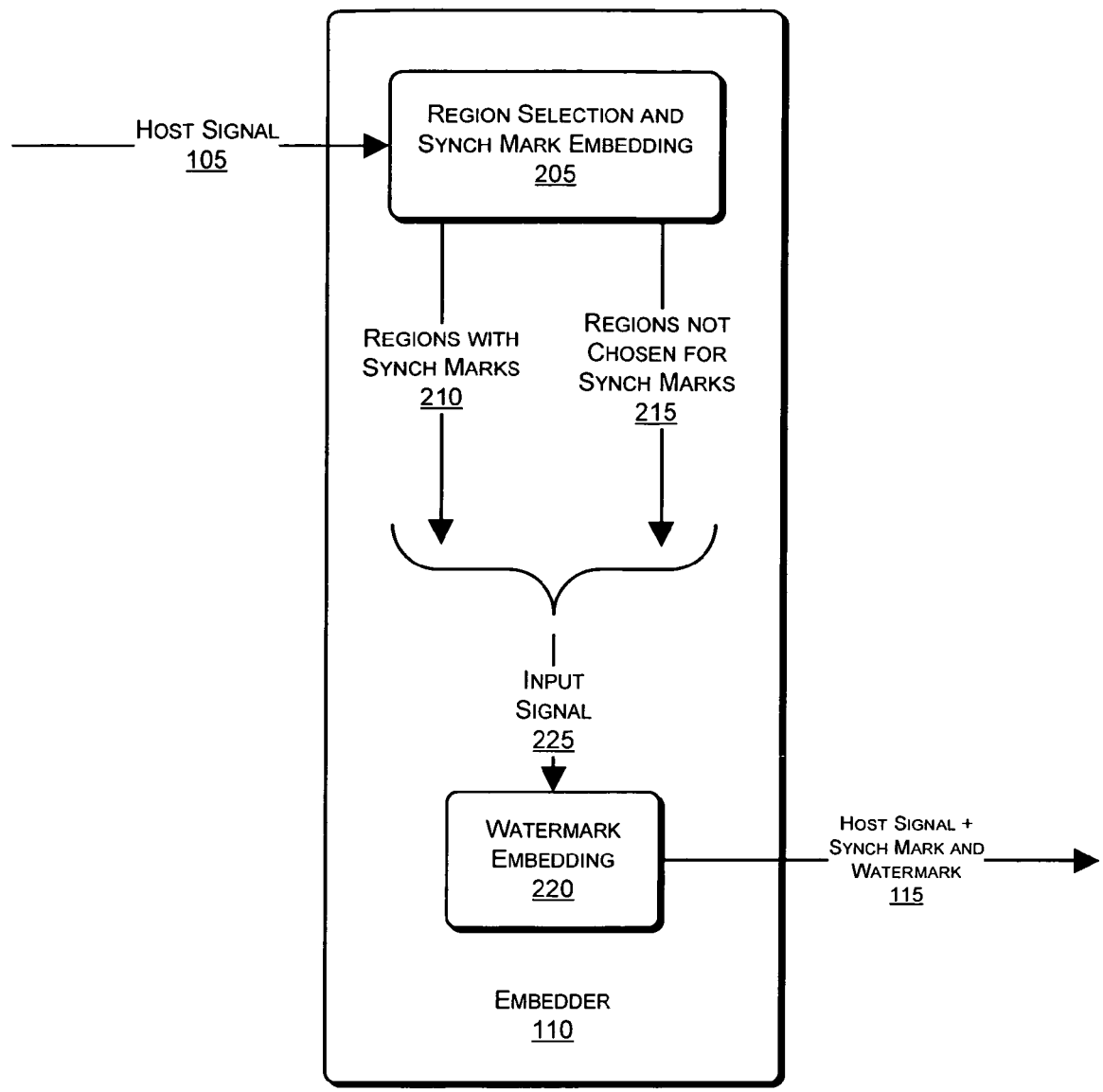
FIG. 2 is a block diagram illustrating further components and data flows relating to a mark embedder as shown in FIG. 1.

FIG. 2 illustrates further components and data flows relating to the embedder 110 shown in FIG. 1. The host signal 105 is received, and then undergoes region selection analysis, which is represented generally as region selection analysis 205. The region selection analysis 205 is discussed in further detail below, but in overview, the host signal 105 is divided into a plurality of regions. Given one of these regions, this region is analyzed to determine whether the region is or would be a good candidate for embedding a synch mark. The process for selecting these regions is described in further detail below. For purposes of overview, however, the embedder 110 selects certain regions to receive synch marks using the illustrative approach described herein. However, the embedder 110 does not explicitly identify for the receiver 130 which regions of the output signal 115 contain embedded synch marks. Instead, at the receiver end, the receiver 130 processes its input signal 140 using the same approach used by the embedder 110 to locate these regions. Accordingly, the process used by the receiver 130 to locate these regions may be characterized as a "blind" process.

Turning to the region selection analysis 205 in more detail, it outputs a set of regions 210 in which synch signals are embedded. These regions 210 are a subset of all regions represented by the host signal 105. Assuming that the host signal 105 represents an image, for example, the regions 210 may represent portions of that image, of any convenient size and composition.

For completeness of description, but not limitation, those regions of the host signal 105 that are not chosen for embedding of synch marks are represented generally as regions 215. It is understood that in implementations of the teachings herein, data representing the regions 215 need not be passed-through the region selection analysis 205, but instead may bypass the region selection analysis 205. The configuration shown in FIG. 2 is shown only for convenience of illustration and discussion.

The regions 210 and 215 that are output from the region selection analysis 205 are routed to a watermark embedding process 220. For convenience, but not limitation, the data within regions 210 and 215 are collectively represented as input signal 225, as shown in FIG. 2. The watermark embedding process 220 embeds or encodes a watermark onto the input signal 225 received from the region selection analysis 205. The output of the watermark embedding process 220 is the output signal 115 shown in FIG. 1.

Figure 3:
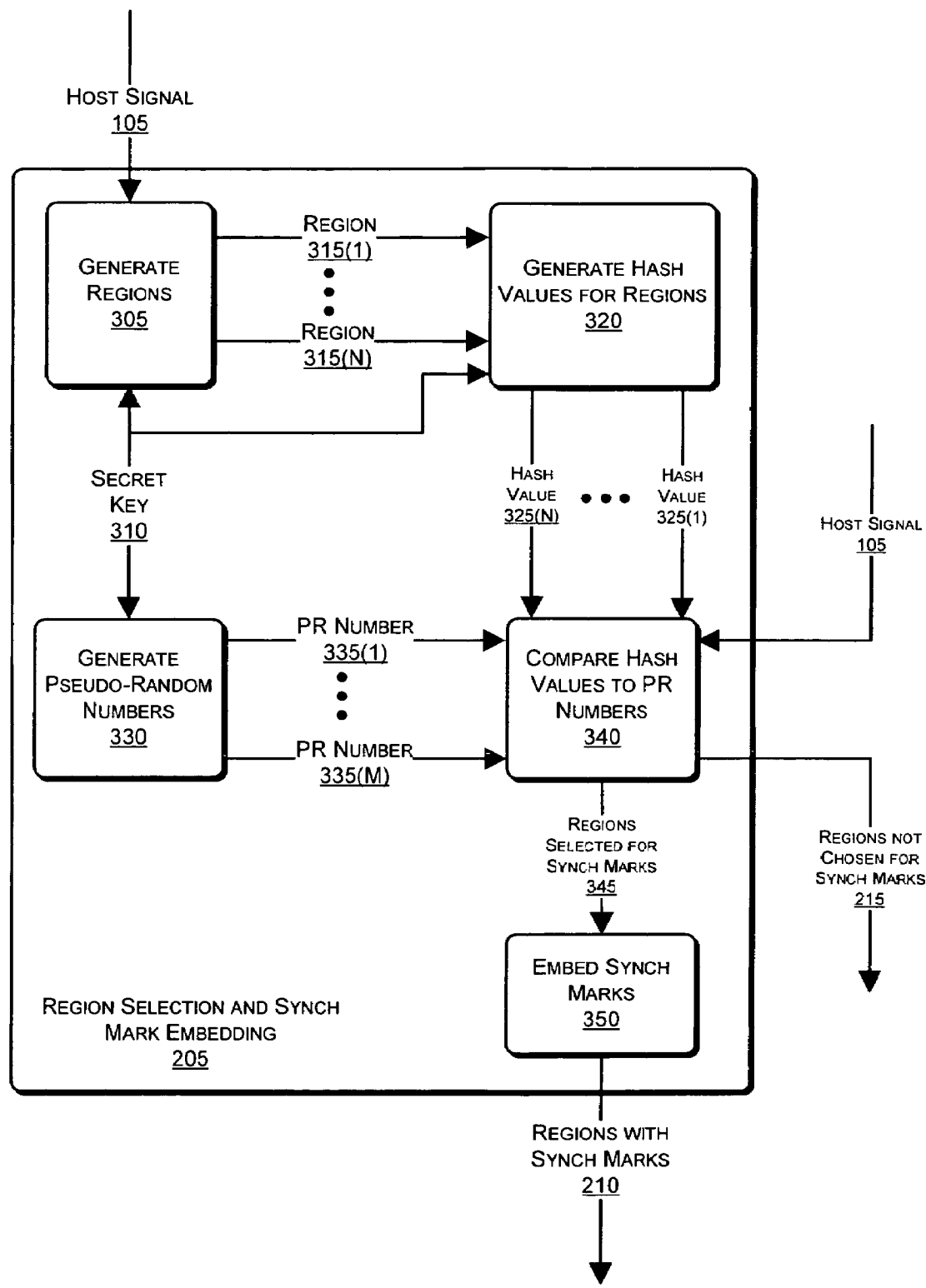
FIG. 3 is a block diagram illustrating further components and data flows relating to region selection analysis and synch mark embedding, as shown in FIG. 2.

FIG. 3 illustrates further components and data flows relating to the region selection analysis 205, which was introduced in FIG. 2. The region selection analysis 205 receives the host signal 105, and provides that latter as input to a region generation process 305. The region generation process 305 uses a secret key 310 to divide the data represented by the host signal 105 into a plurality of regions. More particularly, a secure PRNG (pseudo-random number generator, described further below) can be used to pseudo-randomly generate the region locations and sizes. The secret key is used as the seed of the PRNG in this process. Each secret region (e.g., a rectangle) can be determined by three parameters: width, height, and location of the center. By using the PRNG, these parameters can be generated pseudo-randomly from a uniform distribution within the support of the image. The described implementation can use rectangles, but generally, regions of different shapes can also be used. As far as algebraic development goes, these regions need not be connected. Thus, assuming that the host signal 105 represents an image, the region generation process 305 divides this image into a number of (potentially overlapping) sub-images.

For convenience, assume that the region generation process 305 divides the host signal 105 into N sub-components, with N being any positive integer. Accordingly, FIG. 3 illustrates a plurality of N generated regions, referenced collectively as regions 315 and severally as region 315(1) and region 315(N).

The generated regions 315 are passed to a hash value generation component 320, which functions to generate a respective hash value 325 corresponding to each input region 315; the secret key 310 can also be used in the hash value generation process. Assuming N input regions 315, the hash value generation component 320 can generate N corresponding hash values 325. These generated hash values 325 are referenced collectively as hash values 325 and severally as hash value 325(1) and hash value 325(N).

Figure 4:
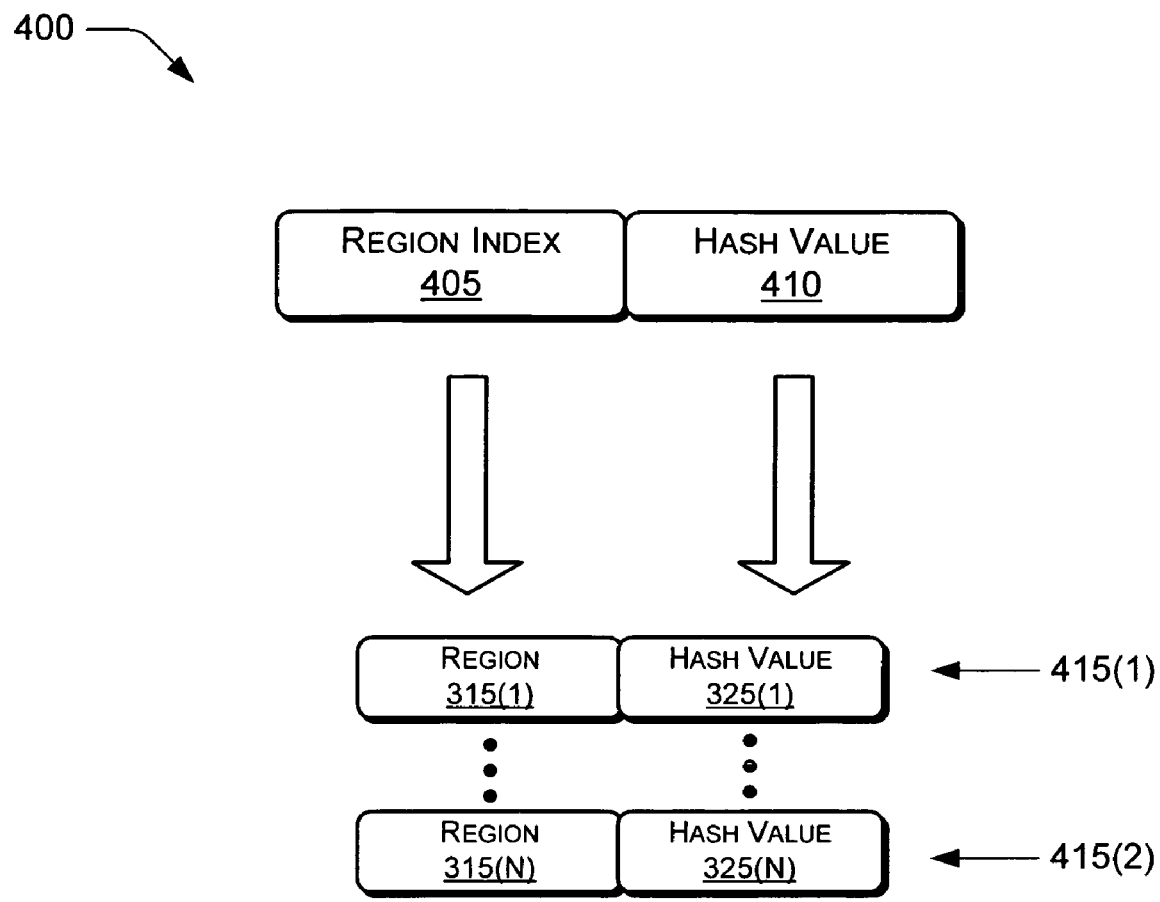
FIG. 4 is a block diagram illustrating a data structure that can be generated, at least in part, by processes shown in FIG. 3.

FIG. 4 illustrates an example of a data structure 400 that can be generated, at least in part, by the region generation process 305 and/or the hash value generation process 320 shown in FIG. 3. The data structure 400 as shown in FIG. 4 is presented only for convenience, and not for limitation. More specifically, it is noted that the content, layout, and organization of the fields as shown in FIG. 4 may be altered, modified, added to, or otherwise revised without departing from the scope and spirit of the subject matter described and claimed herein. It is also understood that while the data structure 400 is described herein as being populated, read-from, updated, or otherwise processed by certain processes and components, this data structure 400 could also be populated, read-from, updated, or otherwise processed by other processes and components without departing from the scope and spirit of the subject matter described and claimed herein As shown in FIG. 4, the data structure 400 can include a key or index column 405 that contains identifiers for the various regions 315 output by the region generation process 305. For example, suitable identifiers or indices may uniquely designate each one of the regions 315(1) through 315(N), as described above. The data structure 400 can also include a column 410 that contains the various hash values 325 output by the hash value generation component 320 for each region 315. Finally, the data structure 400 can relate the regions 315 to corresponding hash values 325. For example, a row 415(1) of the data structure 400 relates the region 315(1) to a corresponding hash value 325(1), and a row 415(N) relates the region 315(N) to a corresponding hash value 325(N).

Returning to FIG. 3, a pseudo-random number generator (PRNG) 330 is operative to generate a plurality of pseudo-random (PR) numbers 335, based on the same secret key 310 used by the region generation process 305. Furthermore, the same (or potentially a different) PRNG may be used in hash-value-generator 320 to generate the hash values 325, given the regions 315; this connection is shown by the dashed arrow in FIG. 3. For example, assume that the PRNG 330 generates a set of M PR numbers 335, where M is a positive integer. These M generated PR numbers 335 are referenced collectively as PR numbers 335 and severally as PR number 335(1) and PR number 335(M).

In some, but not all, possible implementations of the region selection analysis 205, the PRNG 330 can be adapted to generate a substantially larger number of PR numbers 335, as compared to the regions 315 output from the region generation process 305. Put differently, M and N may be related as follows: M>>N.

The region selection analysis 205 can include a process 340 that compares the PR numbers 335 to the hash values 325 that correspond to the regions 315 into which the host signal 105 was divided. The comparison process 340 may, for example, refer to a data structure such as the data structure 400 discussed above. In some implementations, the hash values 325 and/or the PR numbers 335 may be sorted as appropriate to facilitate the comparison. For example, the hash values 325 and/or the PR numbers 335 may be sorted in ascending or descending order to facilitate comparison therebetween. The comparison process 340 may also compute differences between the hash values 325 and the PR numbers 335, and sort these computed differences in, for example, ascending order.

In any event, the comparison process 340 can select instances of the hash values 325 that approximately match corresponding instances of the PR numbers 335. For example, the comparison process 340 may select the top X instances of hash values 325 that most closely match the PR numbers 335, where X is a positive integer. How closely or approximately the hash values 325 match the PR numbers 335 is discussed in further detail below.

Having identified the top X instances of the hash values 325 that most closely match the PR numbers 335, the comparison process 340 can correlate the selected hash values 325 to corresponding regions 315. For example, recall that the data structure 400 can relate given hash values 325 to corresponding regions 315 for which the hash values 325 were computed by the hash value generation component 320. An example of the foregoing processing is now discussed in connection with FIG. 5.

Figure 5:
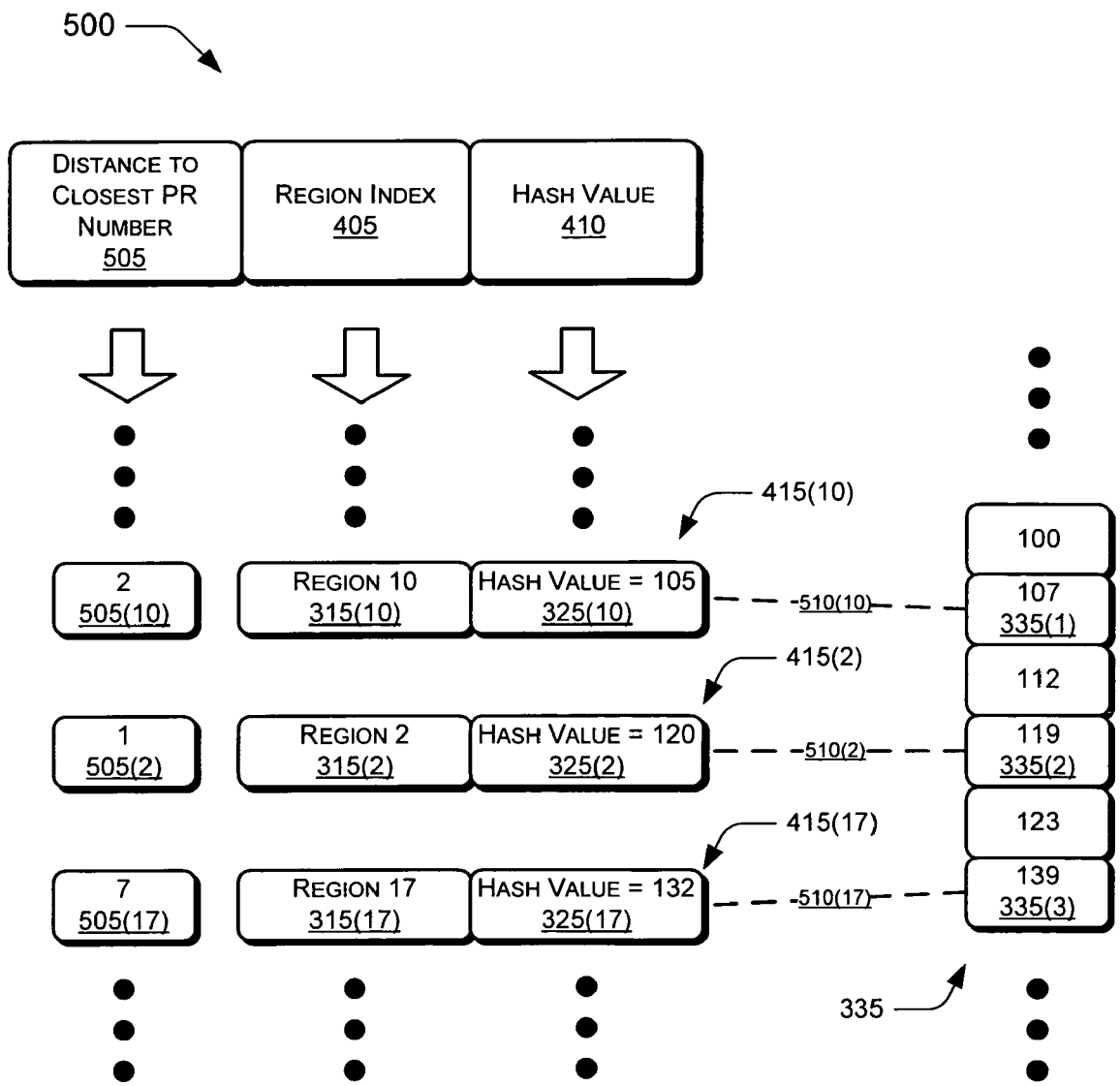
FIG. 5 is a block diagram illustrating a data structure that may be useful in facilitating a comparison process as shown in FIG. 3.

FIG. 5 illustrates a data structure 500 that may be useful in facilitating the comparison process 340 shown in FIG. 3. For convenience, the data structure 500 incorporates elements of the data structure 400 discussed previously. More particularly, the columns corresponding to the region index 405 and the hash values 410 are carried forward in FIG. 5. The data structure 500 also includes illustrative contents for three rows 415(10), 415(2), and 415(17). Row 415(10) corresponds to a region 315(10) having a hash value 325(10) of "105". Row 415(2) corresponds to a region 315(2) having a hash value 325(2) of "120". Row 415(17) corresponds to a region 315

(17) having a hash value 325(17) of "132". It is understood that the example hash values are not to be confused the reference numbers used here and in the drawings.

Assume that the data structure 500 has previously been sorted in ascending order using the hash values column 410 as the sort key. Thus, the hash values 325(10), 325(2), and 325(17) and corresponding regions 315(10), 315(2), and 315(17) would appear as shown in FIG. 5. Assume further that a sequence of PR numbers 335 having values of "100", "107", "112", "119", "123", and "139" has been generated by, for example, the PRNG 330, and that PR numbers 335 are available for analysis as shown in FIG. 5.

It is understood that these hash values 325 and PR numbers 335 as shown in FIG. 5 are chosen for simplicity and ease of illustration and discussion. The hash values 325 and PR numbers 335 shown in FIG. 5 do not limit in any way the range and/or contents of the hash values 325 and the PR numbers 335 that are possible in implementations of the teachings herein.

The comparison process 340 can operate in conjunction with the data structure 500 by comparing respective hash values 325 to the PR numbers 335 and determining which of the hash values 325 are closest to ones of the PR numbers 335. Accordingly, the data structure 500 can define a column 505 that contains data fields that indicate how closely the hash value 325 for each row 415 comes to one of the PR numbers 335. Put differently, entries in the column 505 for each row 415 can be the minimum distance between the hash value 325 for that row 415 and the closest one of the PR numbers 335. Note that, in FIG. 5, the same sequence of PR numbers 335 have been compared to the hash values 325 only for illustration. In other implementations, the comparison mechanism 340 can compare different sequences of PR numbers 335 to different hash values. In other words, it is possible to compare one particular sequence of PR numbers 335 to one particular hash value (e.g., hash value 325(10)), and to compare a completely different sequences of PR numbers 335 to the other hash values (e.g., hash values 325(2) and 325(17).

Applying the foregoing to the example at hand, the hash value 325(10) of "105" is closest to the PR number 335(1), which is assumed to have a value of "107". This relationship is denoted in FIG. 5 by the line 510(10). Accordingly, a field 505(10) for the row 415(10) is filled with the value "2" which is equal to |325(10)−335(1)|. Similarly, the hash value 325(2) of "120" is closest to the PR number 335(2), which is assumed to have a value of "119". This relationship is denoted in FIG. 5 by the line 510(2). Accordingly, a field 505(2) for the row 415(2) is filled with the value "1", which is equal to |325(2)−335(2)|. Finally, the hash value 325(17) of "132" is closest to the PR number 335(3), which is assumed to have a value of "139", which is equal to |325(17)−335(3)|. This relationship is denoted in FIG. 5 by the line 510 (17). Accordingly, a field 505(17) for the row 415(17) is filled with the value "7".

The foregoing process can be repeated for any number of hash values 325 corresponding to regions 315. The regions whose hash values are closest to one of the PR numbers 335 can thus be determined by examining the column of distances 505. A threshold may be applied to determine how closely or approximately the hash values 325 match the PR numbers 335, with those regions 315 that meet the threshold being output as the selected regions 345.

In some but not necessarily all implementations, the data structure 500 may be sorted using the column 505 as a sort key, once the contents of the column 505 have been computed. Having done so, the regions 315 whose hash values 325 approximately match one of the PR numbers 335 may be determined by establishing a convenient cut-off point. For example, the top X regions 315 at or above the cut-off point can be selected for embedding the synch marks. Those regions 315 falling at or below the cut-off point are not selected for embedding the synch marks.

Returning to FIG. 3, the regions 315 that are selected for embedding the synch marks are represented generally in FIG. 3 as selected regions 345. The regions 315 that are not included in the selected regions 345 are represented generally in FIGS. 2 and 3 as the regions 215.

The selected regions 345 are passed to a process 350 that is operative to embed synch marks in the selected regions 345, such that the hash values of the regions 345 then match the PR numbers 335. More particularly, for each selected region 345, after the synch mark is embedded in the region 345, the hash value 325 of the region 345 exactly matches the PR number 335 that was identified as closest to that region 345.

For an example of the foregoing, returning to FIG. 5, recall that the column 505 indicates respective distances or differences between the hash value 325 for each region 315 and the PR number 335 that was closest to that hash value 325. For example, the region 10, referenced as region 315(10) in FIG. 5 was assumed to have a hash value 325(10) of "105". This hash value 325(10) of "105" was found to be closest to the PR number 335(1), which was assumed to have a value of "107". Accordingly, an entry 505(10) having the value "2" was made in the distance column 505 for the region 315(10). The embedding process 350 can then embed a synch mark in the region 315(10), so that a new hash value 325(10) computed for the embedded region 315(10) would equal the value "107" of the corresponding PR number 335(1).

Figure 6:
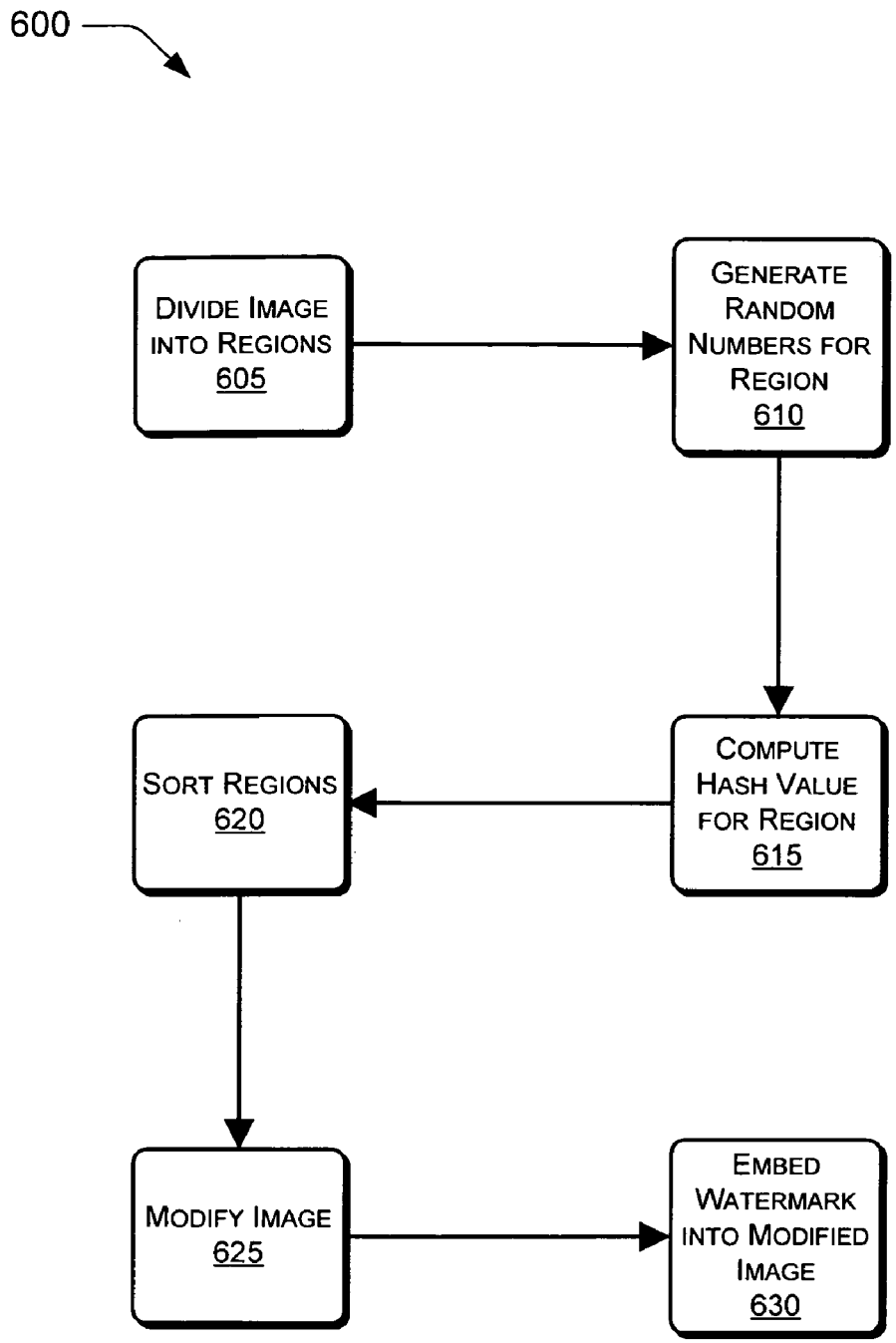
FIG. 6 is a flow diagram illustrating an overall process suitable for embedding synch marks and watermarks into the host signal.

FIG. 6 illustrates an overall process flow 600 suitable for embedding synch marks and watermarks into the host signal 105. The process flow 600 may be performed by, for example, the embedder 110 shown in FIG. 1 and described above. However, the process flow 600 may be performed in whole or in part by other components without departing from the spirit and scope of the teachings herein. Additionally, while FIG. 6 illustrates an example sequence for the process flow 600, the order in which the sub-processes of the process flow 600 are described is not limiting.

For convenience, the process flow 600 is described here as operating on a host signal 105 in the form of an input image. However, it is understood that the process flow 600 may also be suitable for processing other forms of the host signal 105, examples of which are described above.

Block 605 can divide the image I (or its suitably transformed version) into N pseudo-random regions 315 or sub-images using the secret key 310, denoted $K_H$ for convenience herein. The index set of the i-th chosen region 315 can be denoted as $U_i$=1, 2, ..., N.

For each region 315, block 610 can generate N random numbers 335 as the output of a secure pseudo-random number generator (PRNG), such as, for example, the PRNG 330 shown in FIG. 3. It is noted that one possible implementation can include N hash values 325 and N PR numbers 335, such that the i-th hash value 325 can be compared with the i-th PR number 335. In other words, this implementation can be viewed as a special case of the general description given above, for M=N. However, this implementation may be generalized as follows: Suppose we generate a total of M PR numbers 335 and N hash values 325. Assume that M>=N, and without loss of generality, assume that N divides M. Hence, we say that there are M/N PR numbers 335 per hash value 325. In this case, comparison can be done between the closest of such M/N PR numbers 335 for the corresponding hash value 325.

The random numbers 335 may be represented using the following notation: $\{b_i\}_{i=1}^N$. Again, $K_H$ is used as the seed or secret key 310 of the PRNG used in block 610.

Block 615 can compute a corresponding hash value 325 for each region $U_i$, using, for example, the hash generation process 320. The hash value 325 can be computed using a perceptual hash function, which is denoted for convenience as $h_{K_H}(\cdot,\cdot)$, i.e., $h_i = h_{K_H}(I, U_i)$.

Block 620 can sort the regions 315 in increasing order of the deviation of the regions' respective hash values 325 from the respective random number values 335 (i.e., $b_i$ values) generated for each region 315. Put differently, the regions 315 are sorted with respect to $D(h_{K_H}(I,U_i),b_i)$, where $D(\cdot,\cdot)$ is some suitable distortion measure, and the top X regions are selected. These top X selected regions can be labeled or denoted as $\{U_i'\}_{i=1}^X$.

Block 625 can modify the image coefficients in each region $\{U_i'\}_{i=1}^X$, such that the hash value ($\tilde{h}_i$) of the modified image region ($\tilde{U}_i$) would then equal the value of the PR number ($b_i$) that was closest to the previous hash value (hi) for the unmodified region (U'). This modification can be expressed as modifying the regions $\{U_i'\}_{i=1}^X$ so as to obtain modified regions $\{\tilde{U}_i\}_{i=1}^X$, such that $\tilde{h}_i = h_{K_H}(I,\tilde{U}_i) = b_i$. This modification (quantified later) is referred to herein as a hash distortion compensation (HDC). This results in a modified signal or image $\tilde{I}$.

Block 630 can use a second secret key Kw to embed a watermark in the modified image $\tilde{I}$. The watermarked image can now be transmitted to the receiver 130.

Having provided the foregoing description of the embedder 110, the hashing process is now described in more detail.

Hashing Via Pseudo-random (PR) Image Statistics

The hash values 325 discussed herein can be obtained as pseudo-random (PR) linear statistics of PR semi-global regions in the DC subband in the wavelet domain for the input signals or images. A step by step description of a suitable algorithm is now described in connection with FIG. 7.

Figure 7:
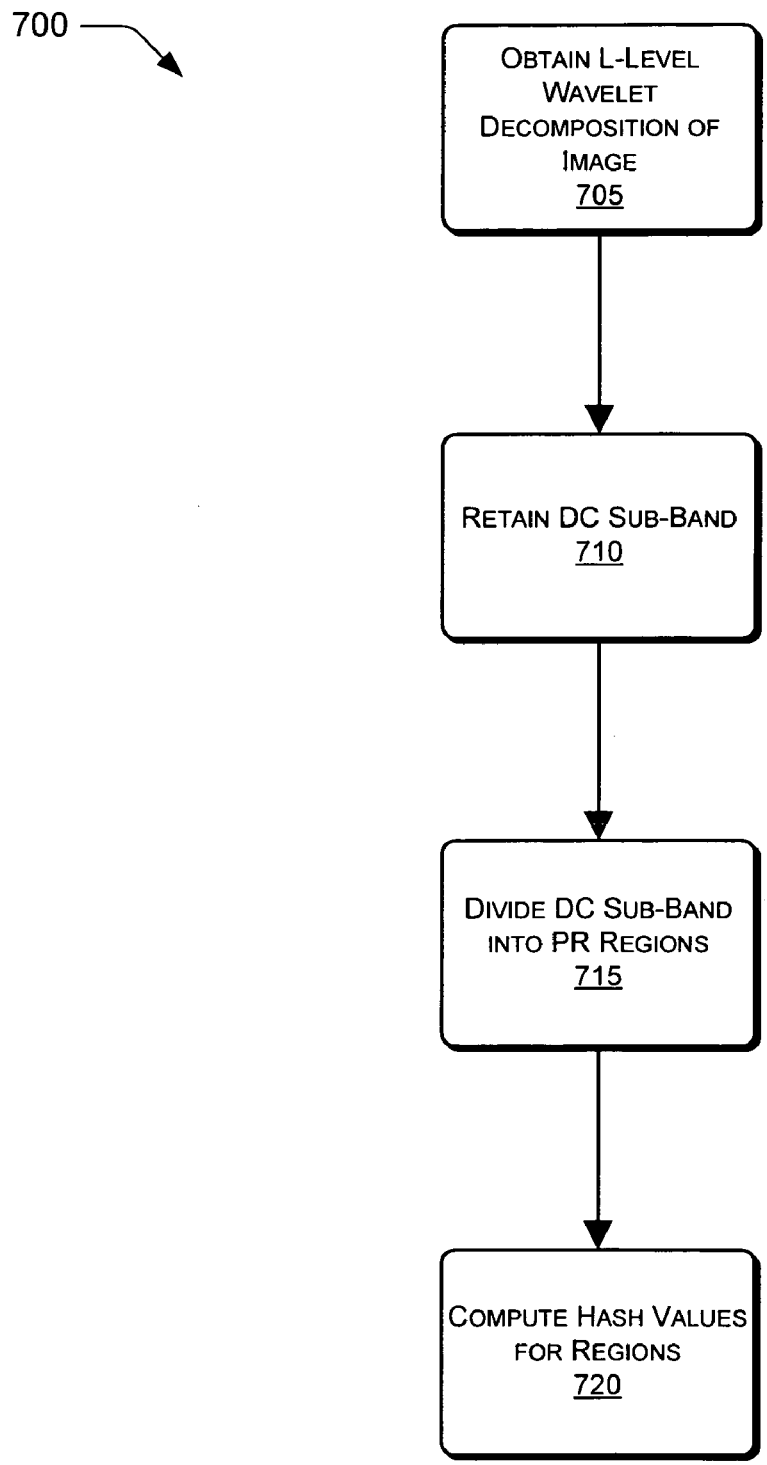
FIG. 7 is a flow diagram illustrating a process flow suitable for generating hash values.

FIG. 7 illustrates a process flow 700 suitable for generating the hash values 325 described herein. Block 705 can obtain an L-level wavelet decomposition for the input signal or image I. Block 710 can retain the DC sub-band resulting from the above wavelet decomposition. Block 715 can divide the DC sub-band into P pseudo-randomly generated rectangular regions, which can be expressed as $\{R_i\}_{i=1}^P$. In some implementations, these regions $R_i$ can overlap with one another.

Block 720 can compute a hash value 325 for each region as a weighted linear combination of the coefficients in that region, where the weights are chosen from a smoothly varying Gaussian random field. In some implementations, an ideal low-pass filter can be applied to a field of independent identically distributed (i.i.d.) Gaussian random variables to achieve smoothness of the weights.

Some implementations of the teachings herein can compute hash values on a semi-global basis, rather than purely on a local basis. The motivation for using hash values computed on a semi-global basis can arise when simple adversarial attacks can change local statistics dramatically, while keeping semi-global statistics approximately invariant. Thus, hash values computed on a semi-global may be more robust against such adversarial attacks.

Hash Behavior and Characteristics

Figure 8:
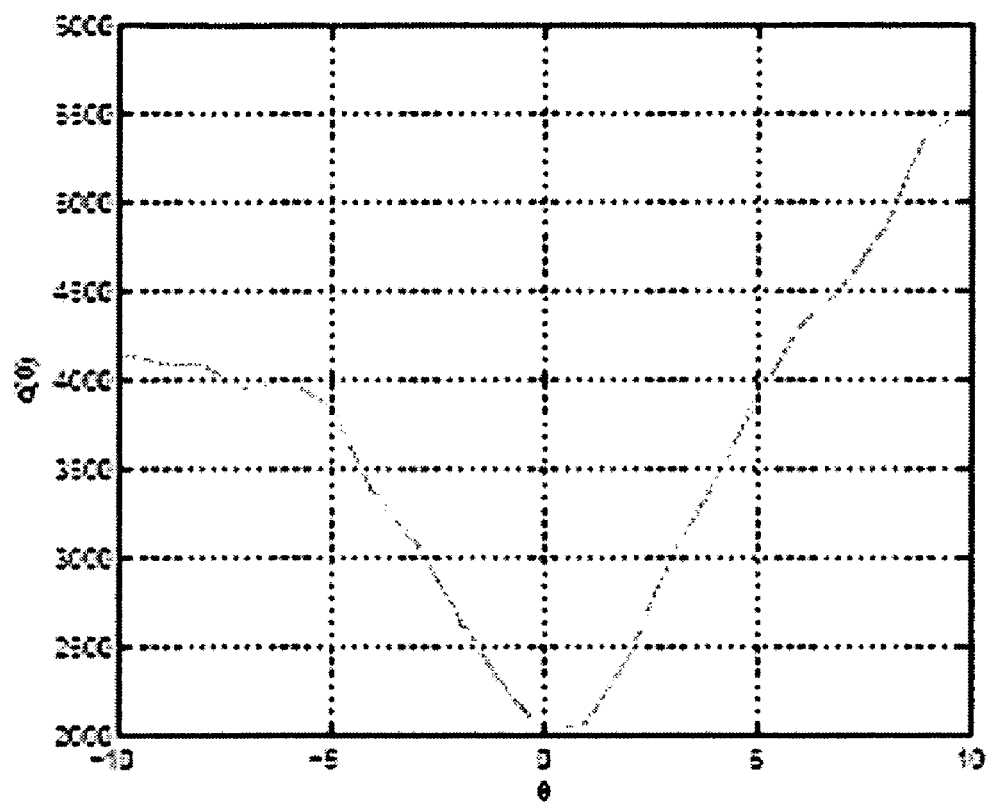
FIG. 8 is a graph illustrating variations in the hash values that result when an image on which the hash values are computed undergoes a rotational attack.

FIG. 8 illustrates variations in the hash values that result when an image on which the hash values are computed undergoes a rotational attack. The angle of the rotational attack is represented by $\theta$, and is plotted along the horizontal axis of the graph shown in FIG. 8. Assume that $\theta$ can range from −10 degrees to +10 degrees.

As the image undergoes a rotational attack of $\theta$ degrees, the hash values computed from the attacked image change, relative to the hash values of the un-attacked image. The change in hash values as a function of the attack angle $\theta$ may be denoted as $d(\theta)$, and may be expressed as $\Sigma_i \| h_{K_H}(I,U_i) - h_{K_H}(I, R_\theta \circ U_i) \|_2$, where the $U_i$ values denote image regions as before, $R\theta$ represents the rotational attack by angle $\theta$, and hence $|\theta|$ represents the magnitude of the attack. Although $d(\theta)$ as shown in FIG. 8 may not be completely monotonic, the distance between the hash values of the original and attacked images shows an increasing behavior as $\theta$ approaches either predefined limit (i.e., −10 degrees and +10 degrees). Therefore, the hash values demonstrate both sensitivity and graceful degradation with respect to the rotation attack, which is a typical example of geometric attacks.

Image Watermarking

A suitable image watermarking algorithm can be based on the semi-global hash values described above in the context of embedding the synch marks. In describing the image watermarking algorithm below, however, it is understood that other image watermarking algorithms may be employed in connection with the rest of the processing described herein.

Watermark Embedding Algorithms

Figure 9:
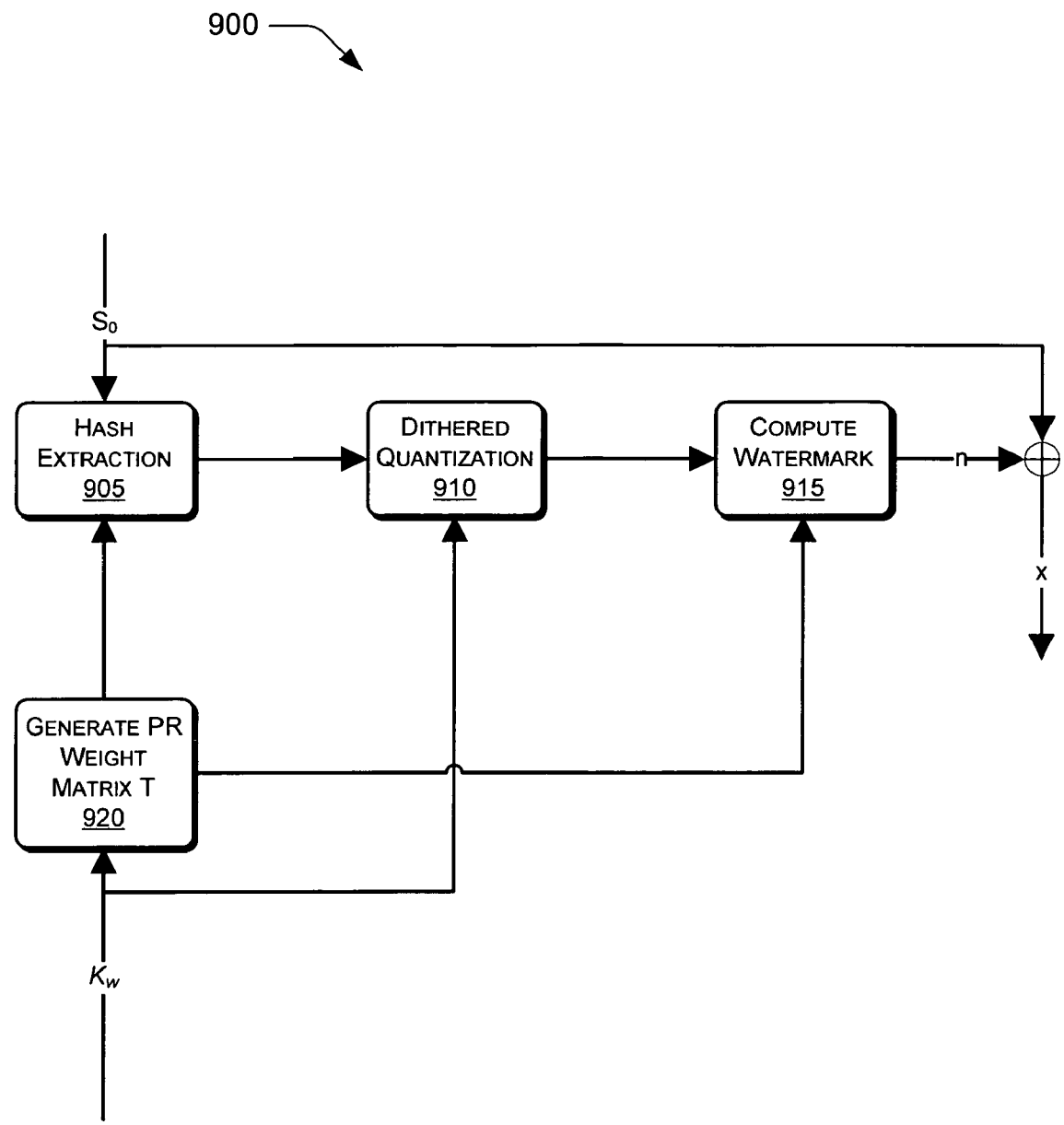
FIG. 9 is a block diagram illustrating an architecture suitable for implementing a watermark (WM) embedding algorithm.

FIG. 9 illustrates an architecture 900 suitable for implementing a watermark (WM) embedding algorithm. The illustrative architecture 900 as shown in FIG. 9 includes blocks representing performing hash extraction 905, dithered quantization 910, and computation of WM sequences 915, which are discussed in further detail below. In FIG. 9, $s_0$ denotes the vector representation of the DC subband in the DWT domain of the image to be watermarked, and $s_0$ is assumed to have a length n.

In block 905, the architecture 900 can perform hash extraction by using a secret key $K_W$ to randomly tilt $s_0$ into k rectangles, where k is assumed to be less than n. At least some of the k rectangles can be overlapping. The index set for the i-th chosen rectangle can be denoted as $R_i$. Given each $R_i$, the secret key $K_W$ can be used to generate random weights $\{t_{ij}\}$ for all $j \in R_i$. Let $t_{ij} = 0$ for $j \notin R_i$. As represented by block 920, weights are generated independently for the different rectangles, whether or not they overlap one another. The secret key $K_W$ is used to generate the PR weight matrix T. Finally, hash values $c_i^{s'}$ can be computed as follows:

$$c_i^{s'} = \sum_{j=1}^n t_{ij} s_j', \quad i = 1, \ldots, k$$

If $T = \{t_{ij}\}$ is assumed to be a k×n matrix, then $c^{s'} = Ts'$.

From a security perspective, choosing $\{t_{ij}\}$ completely independently can maximize the (differential) entropy given the marginal distribution. However, from a robustness perspective, independent weights can result in fragility against de-synchronization attacks, which aim at mismatching the weights and the DWT (discrete wavelet transform) coefficients at the receiver 130. In implementations, correlated weights can be generated by passing the independent weights through an ideal low-pass filter. The cutoff frequency of the low-pass filter can be chosen appropriately as a tradeoff between security and robustness.

Block 910 generally represents a dithered quantization process performed by the architecture 900. The dithered quantization process 910 can include quantizing the host hash vector $c^{s'}$ for mark embedding. In this work, a subtractive dithered scalar quantizer can be used to quantize the host hash values as follows:

$$c_i^x = Q(c_i^{s'} + q_i) - q_i, \quad i=1, \ldots, k.$$

Here, Q is the integer quantizer (which is also known as the integer lattice quantizer, that corresponds to applying scalar uniform quantization along each dimension independently) scaled by $\Delta$ (uniform scalar quantization step size along each dimension), and q is a k-dimension dither vector whose components are i.i.d. uniformly distributed in $$\left(-\frac{\Delta}{2}, \frac{\Delta}{2}\right],$$

and are functions of the secret key $K_W$.

Block 915 generally represents computation of the WM sequence. Watermark embedding can be carried out by finding the watermarked data x such that the corresponding hash vector is equal to $c^x$. The quantization error of the host hash vector $c^{s'}$ can be denoted by e, such that:

$$e_i = c_i^x - c_i^{s'} = Q(c_i^{s'} + q_i) - (c_i^{s'} + q_i), \quad i = 1, \ldots, k.$$

The quantization error $e = c^x - c^{s'}$ can be viewed as the WM in the hash domain. In the image domain, the WM may be written as n, where $$n = x - s'$$

and n is designed so that $T \cdot x = c^x$.

Because of the reduction in dimensionality from the image domain to the hash domain (i.e., k<n), the mapping from e to n is generally not unique. An appropriate algorithm can be designed to minimize the perceptual distortion between the watermarked data and the un-watermarked host data. The watermarked data can hence be derived by solving the following optimization problem:

$$\begin{cases} \min \|n\| \\ \text{subject to } Tx = c^x. \end{cases}$$

The solution to the foregoing problem is the well-known minimum norm solution given by:

$$n_{min} = T'(TT')^{-1}e$$

provided that T has full row rank (here T' represents the transpose of the matrix T).

The notion of hash distortion compensation (HDC) was introduced and discussed above, in the context of embedding synch marks to modify chosen regions 345 of an input image, so that the hash values of the modified regions 345 match PR numbers 335 generated for the regions 345. The concept of HDC is described further now, in connection with FIG. 10.

Figure 10:
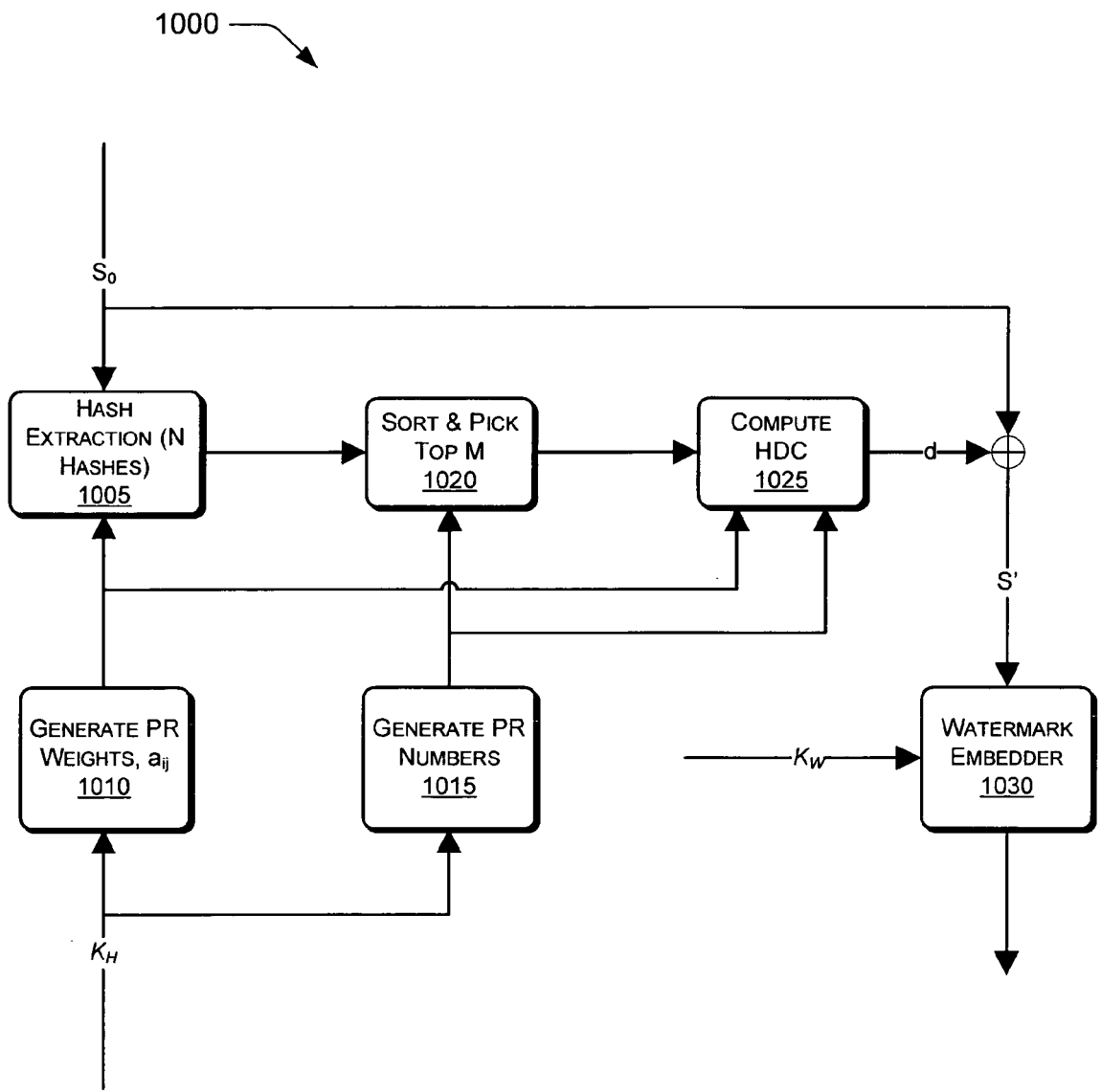
FIG. 10 is a block diagram illustrating another illustrative architecture of the embedder.

FIG. 10 shows another illustrative architecture 1000 of the embedder 110. In FIG. 10, $s_0$ denotes the input host signal or image, more particularly, the vector representation of the DC subband in the DWT domain of the input host image. The process of extracting hashes from the input image $s_0$ is generally repressed by block 1005. The host image $s_0$ is assumed to be of length n.

The secret key $K_H$ is used to randomly tilt $s_0$ into N possibly overlapping regions, where N<n. The regions may take the form of, for example, rectangles. However, other implementations may use forms other than rectangles for the regions. The index set for the i-th chosen rectangle is denoted as $U_i$. As represented generally in block 1010, given each rectangle $U_i$, the secret key $K_H$ is used to generate pseudo random weights $\{a_{ij}\}$ for all $j \in U_i$. Let $a_{ij} = 0$ for $j \notin U_i$. Then, for each $U_i$ as represented in block 1005, compute hash values as follows:

$$h_i = \sum_{i=1}^{N} a_{ij} s_j$$

As represented generally in block 1015, PR numbers can be generated using the PRNG 330. For convenience, the set of generated PR numbers are denoted as $\{b_i\}_{i=1}^{N}$. The PR numbers 330 can be sampled i.i.d from a zero-mean Gaussian distribution, with a suitably chosen variance $\sigma^2$. The greater the variance among the sampled PR numbers ($b_i$), the greater would be the security. However, this may also increase the distortion introduced by HDC embedding. In some implementations, to achieve a tradeoff between these two considerations, the variance of the PR numbers ($b_i$) can be chosen to be approximately the same as the variance of the hash values $h_i$.

As represented generally in block 1020, out of the N regions discussed above, select X regions, where X<<N), such that $$\{U_1', \ldots, U_X'\} = \arg\min_{\{U_{k_1}, \ldots, U_{k_X}\}, k_i \in [1,2,\ldots,N], k_i \neq k_j, i \neq j} \sum_{k=k_1}^{k_X} \|h_k - b_k\|$$

Put differently, the regions are sorted in the order of the deviation of their hash values from the respective PR numbers ($b_i$). Then, the top X regions (i.e., those regions whose hash values deviate the least from the respective PR numbers) are selected.

In matrix notation, for the selected X regions, we may write $$h' = As$$

where A is X×n and contains pseudo-randomly chosen weights corresponding to the regions $\{U_i'\}_{i=1}^{X}$, h' is the X×1 vector of hash values corresponding to the same regions, and s is an n×1 host signal vector.

Block 1025 generally represents the computation of the HDC factor. Assume that $b_i'$ denotes the PRNG outputs corresponding to $\{U_i'\}_{i=1}^{X}$. The objective is to modify the signal s by an additive perturbation d so that, $$b' = As'$$

where $s' = s + d$, and b' contains the $b_i'$ values corresponding to the X regions.

The above system of equations has infinitely many solutions, provided that A is full rank, because X<N<n. In computing the HDC, it is generally desirable to distort s as little as possible. Accordingly, we seek to solve the following problem:

$$\begin{cases} \min \|d\| \\ \text{subject to } As' = b'. \end{cases}$$

The solution to the foregoing problem is the minimum norm solution, given by:

$$d_{min}=A'(AA')^{-1}(b'-h')$$

Note that d is added to the image, so that the hash value $h_i'$, from the i-th region $U_i'$, exactly matches the corresponding pseudo-random number $b_i'$. This is, d compensates for the distortions $\|h_i'-b_i'\|$. Hence, for convenience, d is referred to herein as the hash distortion compensation (HDC).

It is noted that the HDC can be embedded similarly to how the watermark was embedded as discussed above. One difference is that the embedding is done so that the hash values agree with $b_i'$, rather than with quantized PR statistics. Embedding the HDC in this manner ensures that it has robustness properties similar to the watermark, and hence cannot be easily removed like simple synchronization streams, such as templates. Block 1030 generally represents a watermark embedding process, which uses a secret key $K_W$ to embed a watermark signal into the modified host signals'.

Receiver

Having described the embedder 110 and related concepts in detail above, the description now turns in further detail to the receiver 130. The description of the receiver 130 begins with FIG. 11.

Figure 11:
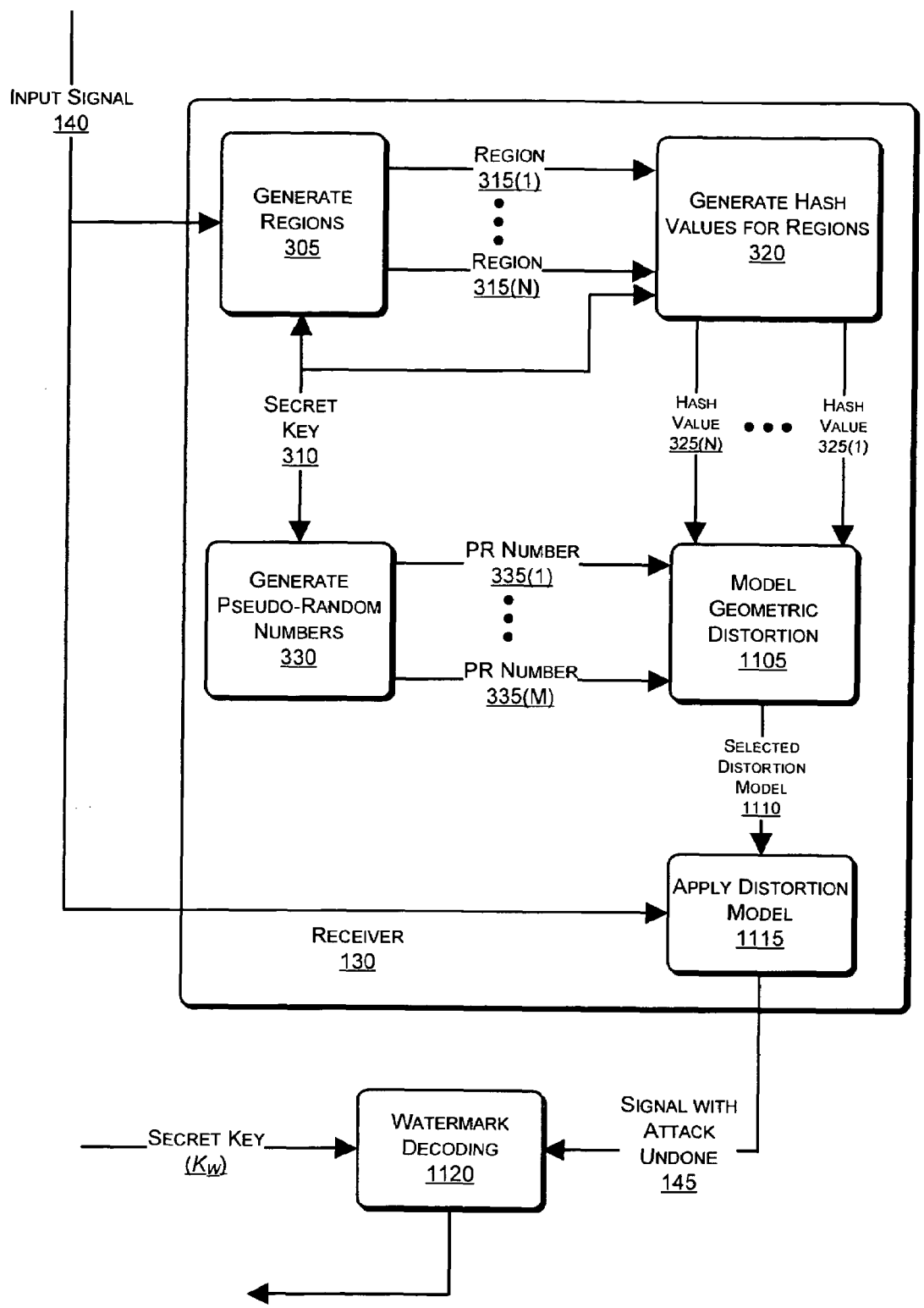
FIG. 11 is a block diagram illustrating further components and data flows related to a receiver.

FIG. 11 illustrates further components and data flows related to the receiver 130. Certain features of FIG. 11 are similar to corresponding features shown in FIG. 3. Accordingly, the same reference numbers are used in both FIGS. 3 and 11 to identify similar subject matter.

The receiver 130 functions by received the input signal 140 after it has been output by the embedder 110. The input signal 140 may or may not have been attacked or distorted after leaving the embedder 110, so one function of the receiver 130 is to determine whether the input signal 140 has been so attacked. For convenience, the input signal 140 is also denoted as $I_r$.

The block 305 generally represents generating or obtaining N random regions or sub-images of the input signal 140 ($I_r$), in a manner similar to the embedder 110. Accordingly, FIG. 11 depicts N regions 315. These N regions 315 are denoted for convenience as $\{R_i\}_{i=1}^{N}$. The same secret key 310 ($K_H$) is used to generate these regions 315 at both the embedder 110 and the receiver 130.

The block 320 generally represents generating hash values for the regions 315. Accordingly, FIG. 11 depicts N hash values 325, with each region 315 having a corresponding hash value 325.

The block 330 generally represents generating N PR numbers, based also on the same secret key 310 ($K_H$) used as a seed for the PRNG 330. Accordingly, FIG. 11 depicts N PR numbers 335. These N PR numbers 335 are denoted for convenience as $\{b_i\}_{i=1}^{N}$.

A block 1105 generally represents a model of any geometric distortion or attack that the input signal 140 may have undergone after leaving the embedder 110. As part of this modeling, the receiver 130 can sort the regions according to the deviation between the PRNG outputs 335 for that region and the hash value for that region. The receiver 130 can also search for an optimum geometric distortion model 1110 (also denoted herein as G*), such that the hash values from the top X regions approximately match the PRNG outputs 335.

It is noted that at the receiver 130, that G* will correctly model the geometric attack when most of the X regions at the receiver 130 are in correspondence with same regions at the embedder 110. In particular, the hash values extracted from the regions at the receiver 130 allow synchronization with the corresponding regions as they stand at the embedder 110.

In block 1115, the inverse of the selected optimum geometric distortion model 1110 (G*) is applied to the input signal 140 ($I_r$) to obtain a synchronized image $I_r^*$. For convenience, the inverse of the optimum geometric distortion model 1110 (G*) is denoted as $(G^*)^{-1}$. The synchronized image $I_r^*$ corresponds to the input signal 140 with any attacks or distortions (with an emphasis on geometric distortions) on that signal 140 undone. Put differently, the signal 145 output from the receiver 130 can be viewed as the input signal 140 with any attacks or distortions undone (with an emphasis on geometric distortions).

In block 1120, watermark decoding can be performed on the signal 145 ($I_r^*$) using the secret key $K_W$ that was used to encode or embed the watermark. It is understood that implementations of the receiver 130 may or may not include the watermark decoding 1120. Also, while example processes for decoding the watermark are presented below, the receiver 130 as described and illustrated herein may be operable with other processes for performing the watermark decoding 1120 without departing from the spirit and scope of the subject matter described herein.

The foregoing scheme is based on first geometrically synchronizing the received image or signal 140 at the receiver 130, and then subsequently applying watermark detection. This is non-trivial to achieve without having a copy of the original image or input signal 105 at the receiver 130. Accordingly, this process is referred to herein as "blind detection" (or "blind decoding").

Recall that the embedder 110 inserts a synchronization mark or hash distortion compensation (HDC) into the regions of the input host signal 105. Recall also that the HDC has properties similar to the robust watermark discussed above, and accordingly can be more difficult to remove than conventional templates, which are often redundant in nature by construction. Embedding the HDC into the image host signal 105 helps the receiver 130 synchronize with the same X regions as selected by the embedder 110, given the knowledge of the hash function and the secret key 310 ($K_H$) used to generate the PR numbers 335 ($b_i$).

In several ways, the design of the hash function enables the receiver 130 to synchronize with the embedder 110 when processing the input signal 140. First, if the entropy of the hash function in the probability space induced by the secret key 310 is made sufficiently high, then the embedder 110 and the receiver 130 may be more likely to encounter hash values that are sufficiently close to the PRNG outputs.

Second, the hash can be made robust to common signal processing (or image intensity) distortions, while also being sensitive to geometric attacks. Note that the attack channel 120 can expose the signal 115 to both kinds of deformations. If the hash is made robust to signal processing distortions, then the hash values computed by the embedder 110 and the receiver 130 for corresponding regions will still be approximately the same, in the absence of a geometric attack.

Sensitivity to geometric attacks can be motivated as follows. For example, let $R_\theta \circ I$ represent the image I rotated by a rotational attack having an attack angle of $\theta$. In this scenario, it is desired that as the attack angle $\theta$ is increased, then $\|h_{K_H}(I)-h_{K_H}(R_\theta \circ I)\|$ increases as well. Ideally, this increase is monotonic. That is, the hash function shows a graceful degradation with respect to the magnitude of the geometric attack. If the hash function exhibits such behavior, then it can enable an efficient search for G* at the receiver 130. In the absence of a hash function exhibiting such characteristic behavior, the receiver 130 may be left with brute-force or exhaustive searching using over the entire attack parameter space, which may be practically and/or computationally infeasible.

Figure 12:
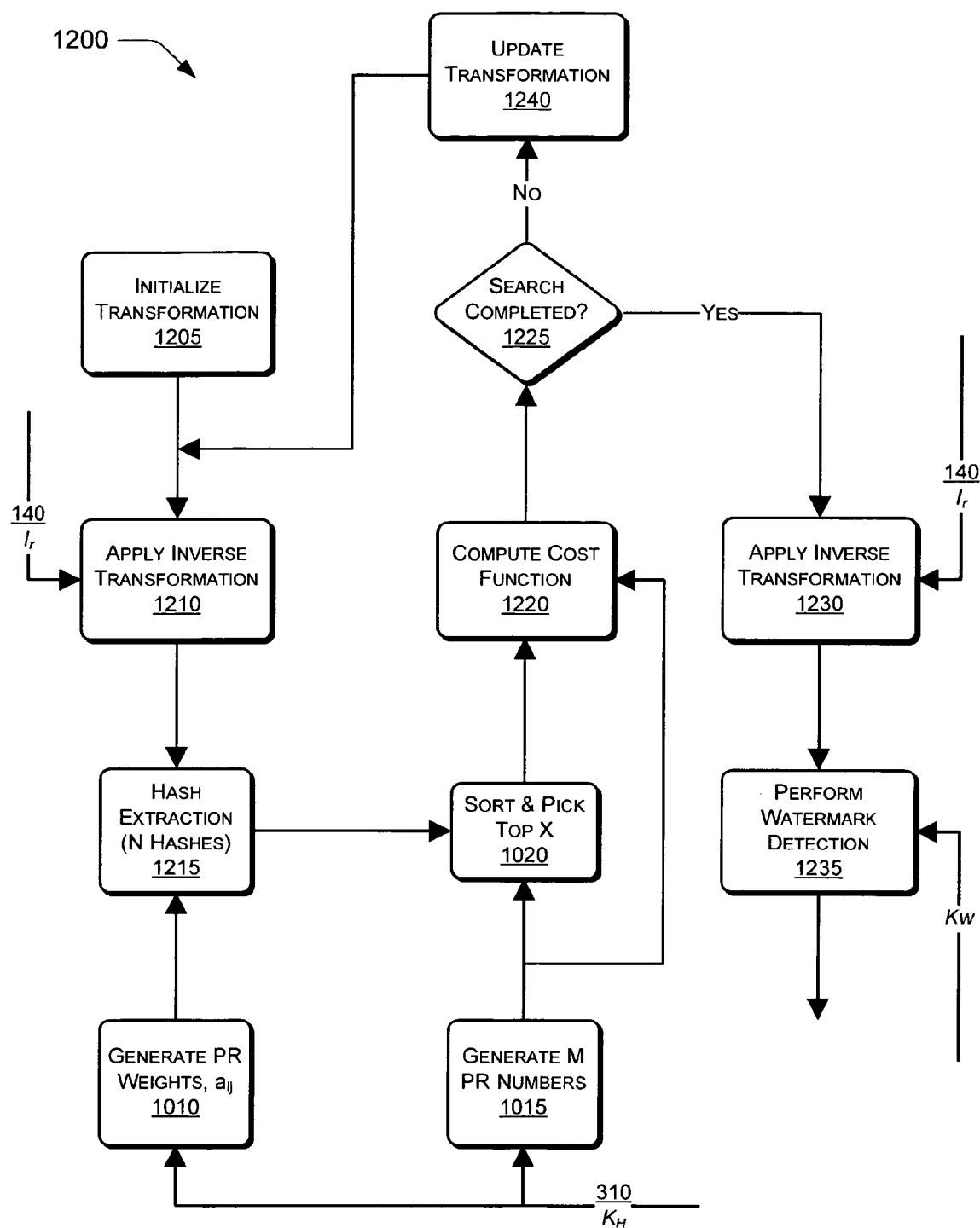
FIG. 12 is a flow diagram illustrating an overall process flow that may be performed by the receiver.

FIG. 12 illustrates a process flow 1200 that may be performed by the receiver 130. Block 1205 can initialize a transformation model, which is used to model a geometric attack or distortion that the input signal 140 ($I_r$) may have undergone while passing through the attack channel 120. The geometric attack on the image can be modeled via an affine transformation G, such that $G(u)=v=L \cdot u+m$, where L is a 2×2 matrix and m denotes a 2×1 vector.

Using an affine transform enables the modeling of distortions such as rotation, scaling, translation, and shearing effects. Further, several other geometric deformations can be well approximated by an affine transformation.

For convenience, as far as joint rotation, translation and scaling attacks are concerned, the matrix L can be expressed as:

$$\begin{pmatrix} r\cos(\theta) & r\sin(\theta) \\ -r\sin(\theta) & r\cos(\theta) \end{pmatrix}$$

where r gives the scaling parameter, and $\theta$ is the rotation angle. Similarly, the vector m can be expressed as:

$$\begin{pmatrix} m_1 \\ m_2 \end{pmatrix}$$

In other words, for rotation, scaling and translation, the geometric attack on the image can be modeled by a 4×1 parameter vector p, given by:

$$\begin{pmatrix} r \\ \theta \\ m_1 \\ m_2 \end{pmatrix}$$

The discussion herein describes global affine transformations parameterized by four scalars for illustration only, and not to limit possible implementations of the teachings herein. The search algorithm described below can readily be extended to the whole class of global affine transformations specified by six parameters, or even to a more general parameterization of the geometric attack as locally affine transformations on image pixels. Global affine transformations are discussed in detail herein because the watermarking scheme described above is naturally robust to small local deformations.

Block 1210 can apply the inverse of the current model of the attack transformation ($G^{-1}$) to the input signal 140 ($I_r$). Block 1215 can extract hash values for the regions of the transformed input signal 140 ($I_r$).

Note that the hash values are extracted based on weights that are generated in block 1010 (carried forward from FIG. 10) based on the secret hash key 310 ($K_H$). Note also that block 1015 is also carried forward from FIG. 10, such that using the secret hash key 310 ($K_H$) as a seed, PR numbers are generated for each region of the input signal 140 ($I_r$).

Block 1020 is carried forward from FIG. 10, and block 1020 can sort the regions in increasing order of the deviation between the hash values for that region (after the inverse of the transformation ($G^{-1}$) is applied to the regions) and the PR numbers generated in block 1015. The top X regions are then picked.

Block 1220 can compute a cost function. This cost function reflects how likely it is that the current transformation (G) reflects the attack or distortions that the input signal 140 ($I_r$) actually underwent in the attack channel 120. The cost function is detailed further below in connection with FIG. 16.

Based on the result of the cost function, block 1225 evaluates whether the search for an optimum attack model or transformation (G) is complete. Put differently, block 1225 can determine how likely it is that the current model of the attack (G) reflects the actual attack on the input signal 140 ($I_r$).

Taking the "Yes" branch from block 1225, if the current model of the attack (G) reflects the actual attack on the input signal 140 ($I_r$), then block 1230 can apply the inverse of the current model of the attack ($G^{-1}$) to the input signal 140 ($I_r$). Block 1230 can effectively undo the geometric attack or distortion that the inputs signal 140 ($I_r$) underwent, resulting in the signal 145 as shown in FIGS. 1 and 11. Afterwards, block 1235 can perform watermark detection on the signal 145, using the same secret key ($K_W$) used by the embedder 110 to embed the watermark onto the host signal 105 (FIG. 1).

Returning to block 1225, and taking the "No" branch therefrom, if the current model of the attack (G) is not likely to reflect the actual attack on the input signal 140 ($I_r$), then block 1240 can update the model of the attack (G) to more accurately reflect the actual attack on the input signal 140. The process flow 1200 then returns to block 1210, which can apply the inverse ($G^{-1}$) of the updated model of the attack (G) to the input signal 140 ($I_r$). The foregoing process is repeated until it arrives at decision block 1225, which can evaluate the updated distortion model (G) as described before. If appropriate, the distortion model (G) can be refined repetitively or iteratively (block 1240, et seq.), and the foregoing process can be repeated until the model is deemed sufficiently likely to reflect the actual attack on the input signal 140 ($I_r$) (block 1230, et seq.).

Having provided the foregoing description of the process flow 1200 performed by the receiver 130, the discussion proceeds to a more detailed description of the search for appropriate attack model parameters.

Algorithm for the Attack Model Parameter Search

The image signal 140 ($I_r$) at the receiver 130 can be synchronized with the image 115 as marked by the embedder 110 by searching over the space of the parameter vector p, such that:

$$p^* = \underset{p}{\operatorname{argmin}}\ D(p), \text{ and}$$

$$D(p) = \sum_{i=1}^{X} \|\hat{h}_i - \hat{b}_i\|,$$

where $\hat{h}_i = h_{K_H}(I_r(G)^{-1} \circ \hat{U}_i)$, G denotes the geometric transformation specified by the vector p, and $\hat{b}_i$ denotes the PRNG output corresponding to region $\hat{U}_i$, and $$\{\hat{U}_1, \ldots, \hat{U}_X\} =$$

$$\operatorname{argmin}_{\{U_{k_1}, \ldots, U_{k_X}\}, ki \in [1,2,\ldots,N], k_i \neq k_j, i \neq j} \sum_{k=k_1}^{k_X} \|h_{K_H}(I_r, (G)^{-1} \cdot U_k) - b_k\|$$

Figure 13:
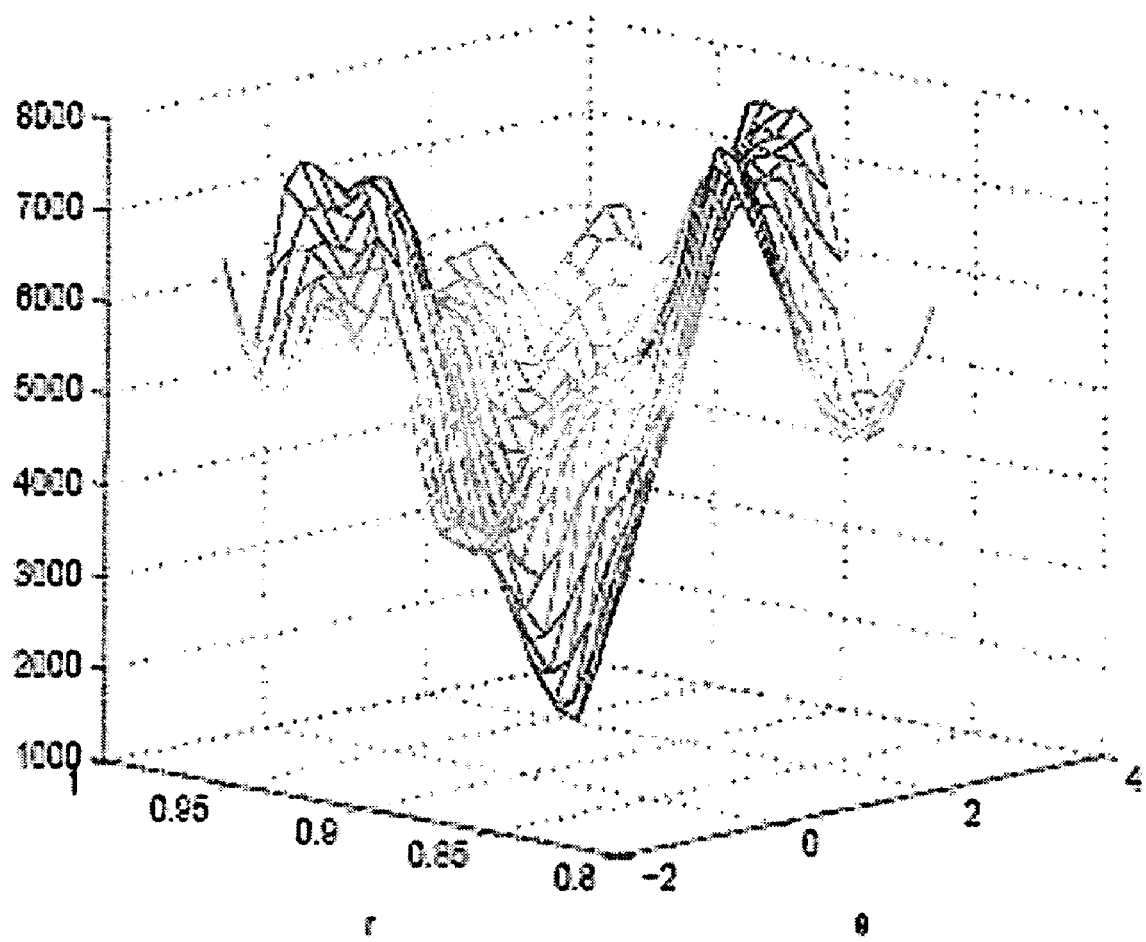
FIGS. 13 through 15 are three-dimensional graphs plotting a synchronization cost function as it varies in response to various parameters of three different geometric attacks.
Figure 14:
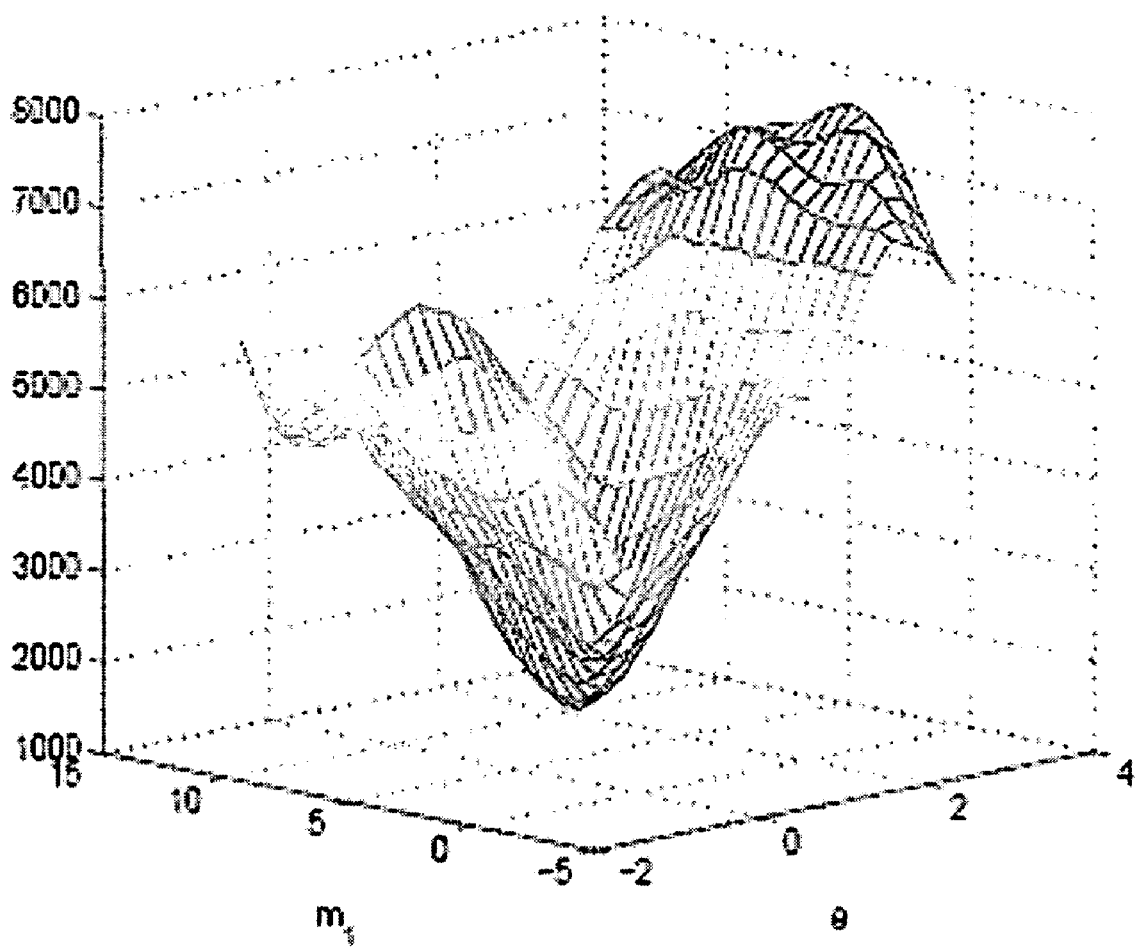
Figure 15:
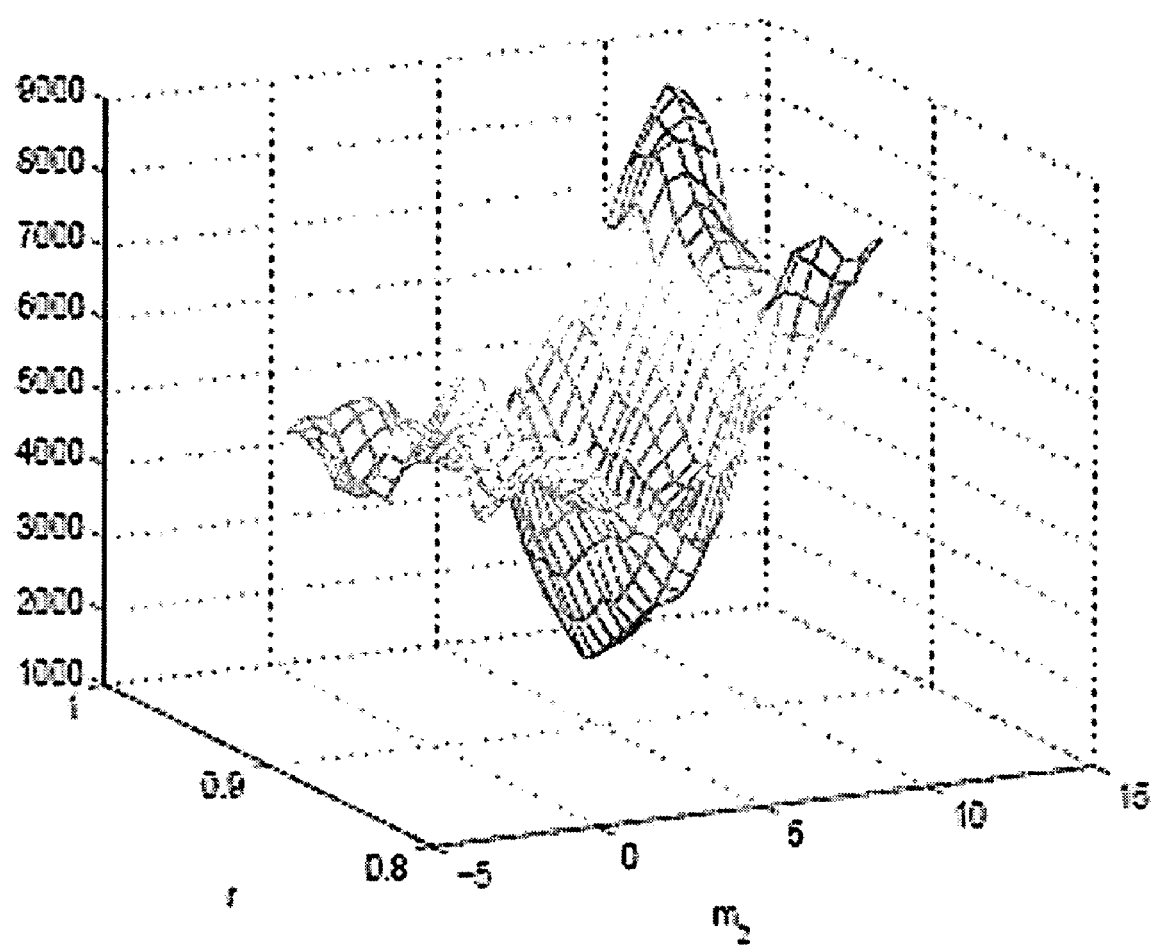

An algorithm to find p* can be dictated by the behavior of D(p) with respect to p. FIGS. 13 through 15 illustrate this behavior. In particular, for a given image, FIG. 13 plots D(p) as a function of r, θ with $m_1=0$ and $m_2=0$. In FIG. 13, the actual attack parameters are assumed to be r=1.1, and θ=−1 degrees.

Similarly, FIG. 14 shows D(p) as a function of θ and $m_1$, with $m_2=0$ and r=1 (i.e. no scaling). The actual attack for FIG. 14 is assumed to be θ=−1 degrees and $m_1=-5$ pixels translation.

Finally, FIG. 15 shows D(p) as a function of r and $m_2$, with $m_1=0$ and θ=0. For FIG. 7, the actual attack is assumed to be r=1.1 and $m_2=-5$ pixels translation. It is understood from this description, for purposes of notation, that attack and undo parameters are inverses of one another. For rotation and translation, the attack parameters and the corresponding undo parameters are the negatives of one another, i.e., a rotation attack of θ=−1 degrees can be undone by an "inverse" attack of θ=1 degrees. For scaling, the attack parameter and the corresponding undo parameter are the reciprocals of one another, i.e., a scaling attack of r=2 can be undone by an "inverse" attack of r=½.

A first immediate inference from FIGS. 13-15 is that in each case, the global minimum is indeed achieved at the true attack parameters. Second, D(p) as a function of p is far from convex. This characteristic makes traditional gradient search difficult, since gradient search depends heavily on choice of the starting point. However, it can be seen in FIGS. 13-15 that D(p) is approximately locally convex. Based on this observation, a divide and conquer type gradient search algorithm is described herein.

In particular, the described algorithm includes dividing the total attack parameter space into a finite number of regions, and performing gradient searches in each region. Let $[-\theta_{max}, \theta_{max}]$ denote the range of interest for the rotation attack angle θ, let $[1-r_{max}, 1+r_{max}]$ denote the range of interest for the scaling attack parameter r, and let $[-m_{max}, m_{max}]$ denote the range of translation attack parameters $m_1$ and $m_2$. A step-by-step description of the search algorithm follows, discussed in connection with FIG. 16.

Figure 16:
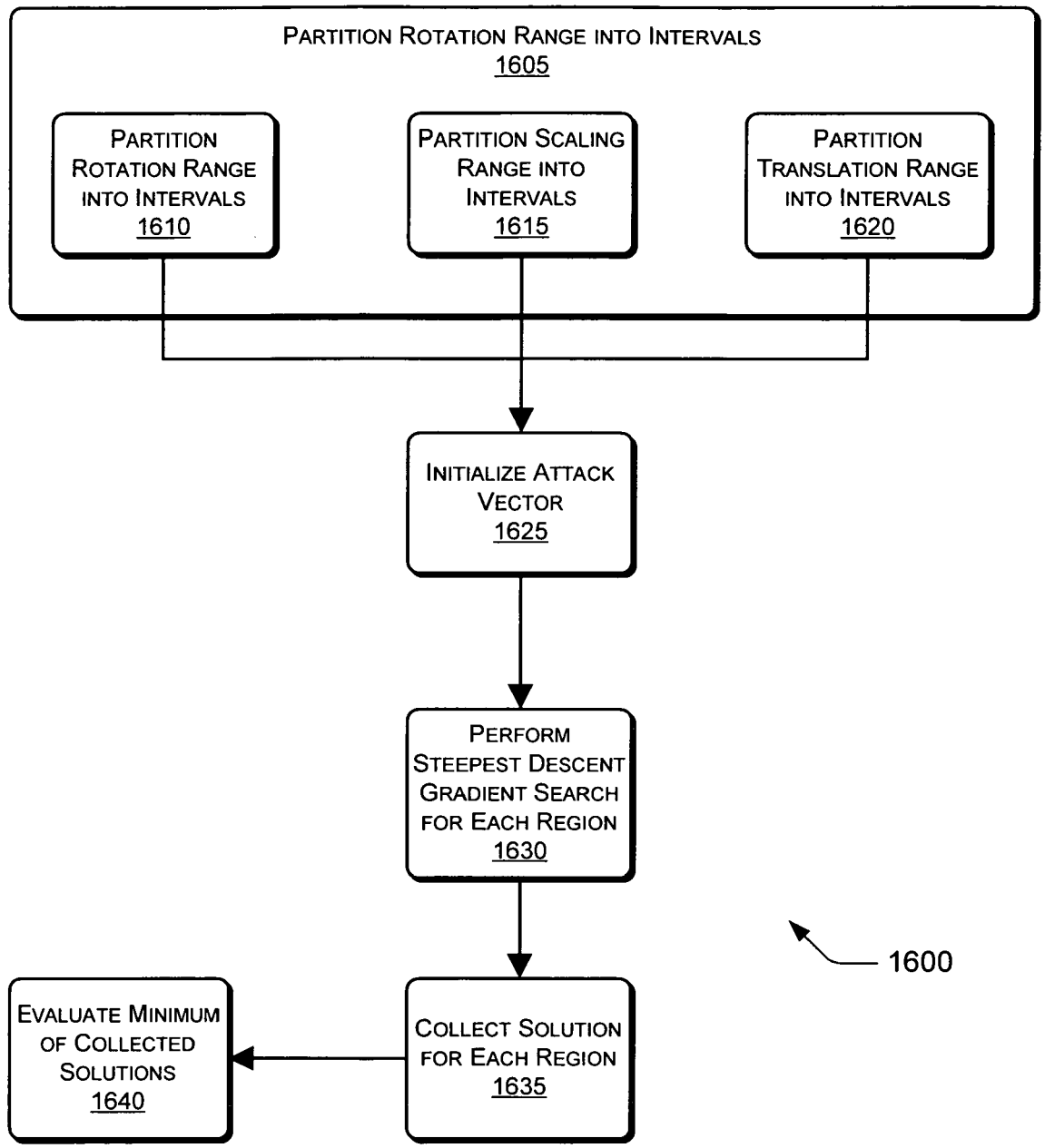
FIG. 16 is a flow diagram illustrating a process flow for defining parameters of a model of an attack undergone by an image input to the receiver.

FIG. 16 illustrates a process flow 1600 for defining parameters of a model of an attack undergone by an image or signal input to the receiver 130. Block 1605 generally represents partitioning the parameter space of possible attacks. For convenience only, blocks 1610, 1615, and 1620 are shown within block 1605 to represents sub-processes of this partitioning process. More particularly, block 1610 represents uniformly partitioning the rotation range $[-\theta_{max}, \theta_{max}]$ into $N_\theta$ intervals. Similarly, block 1615 represents partitioning the scaling range $[1-r_{max}, 1+r_{max}]$ into $N_r$ intervals, and block 1620 represents partitioning each of the translation parameter ranges $[-m_{max}, m_{max}]$ into $N_{m1}$ and $N_{m2}$ intervals, respectively.

As a result of block 1605 (i.e., blocks 1610, 1615, and 1620), the entire parameter space is partitioned into $N_{tot}=N_r \times N_\theta \times N_{m1} \times N_{m2}$ regions. For convenience, these regions are labeled herein as $\{V_i\}_{i=1}^{N_{tot}}$.

Block 1625 can initialize the attack vector p, for example, with a randomly selected set of parameters. These parameters are selected as a "first try" at determining the appropriate attack parameters, and are tested or evaluated as described below.

For each of the regions partitioned above in block 1605, block 1630 can perform a steepest descent gradient search. Generalizing, in the i-th region, a steepest descent gradient search is performed based on a random initialization of $p=p_i^0 \in V_i$. In particular, $$p_i^{k+1} = p_i^k - \alpha \nabla_{p_i^k} D(p),$$

where $\nabla_{p_i^k} D(p)$ represents the gradient of the synchronization cost function D(p) evaluated at $p_i^k$, and α is a scalar used to adjust the size of the update taken in the inverse direction of the gradient. The stopping criterion can be either a stationary point, i.e., $\nabla_{p_i^k} D(p) \approx 0$, or if the update $p_i^{k+1}$ goes outside the region $V_i$. The foregoing is repeated for all $\{V_i\}_{i=1}^{N_{tot}}$.

Some implementations of block 1630 may "condition" the synchronization cost function D(p) before performing any kind of gradient search. This is typically done by defining a new function $E(p)=D(W_p)$, where W is a diagonal matrix. Note that E(p) can have the same minimizer as D(p). The entries of the diagonal matrix W can be experimentally optimized to enhance the convergence of the gradient descent algorithms.

Block 1635 can collect the solution (i.e., stopping point) $p_i^*$ for each region. These solutions $p_i^*$ represent the minimums of the synchronization cost function D(p) for each one of the regions into which the attack space was partitions in block 1605.

Block 1640 can evaluate the solutions $p_i^*$, and can chose the minimum cost across all of the regions as the minimizer of the synchronization cost function D(p) across the space. This evaluation can be expressed as:

$$p^* = \arg\min_{p_i} D(p_i^*)$$

Radius of Convergence

One issue for the search algorithm shown in FIG. 16 is how to select the size of the interval in the uniform partitioning (block 1605, et seq.) across each attack parameter. Put differently, how to select the size of each $V_i$.

Note that the number of gradient searches, and hence the complexity of the algorithm, can increase as a function of $N_r$, $N_\theta$, $N_{m1}$, and $N_{m2}$. In particular, $N_r=N_\theta=N_{m1}=N_{m2}=1$ corresponds to the case when a single gradient search is performed based on a random initialization of p in the parameter space. Since D(p) may be far from convex, the chances of converging to the true p* in this case may be bleak. Likewise, as $N_r$, $N_\theta$, $N_{m1}$, and $N_{m2}$ become very large, the algorithm can approach the cost of an exhaustive search. In that case, it is certain to find the correct minima, though at the cost of heavily increasing the computational cost.

In light of the above discussion, it is possible to quantify a "probability of convergence", given the region size. More specifically, it is possible to quantify the conditional probability measure P(Convergence/$r_1, r_2, r_3, r_4$), i.e., the probability of convergence of a point $\tilde{p}$ that is a distance of $$\sqrt{\sum_{i=1}^{4} (r_i)^2}$$

from $\tilde{p}$. In other words, $r_i = |p^*(i) - \tilde{p}(i)|$, where p(i) denotes the i-th component of the parameter vector p for $1 \leq i \leq 4$. In relation to the attack parameters discussed above, $r_1$ can be interpreted as the radius along the scaling direction, $r_2$ as the radius along rotation, and $r_3$ and $r_4$ as the translation radii.

An algorithm for computing the above conditional probability measure is now described in connection with FIG. 17.

Figure 17:
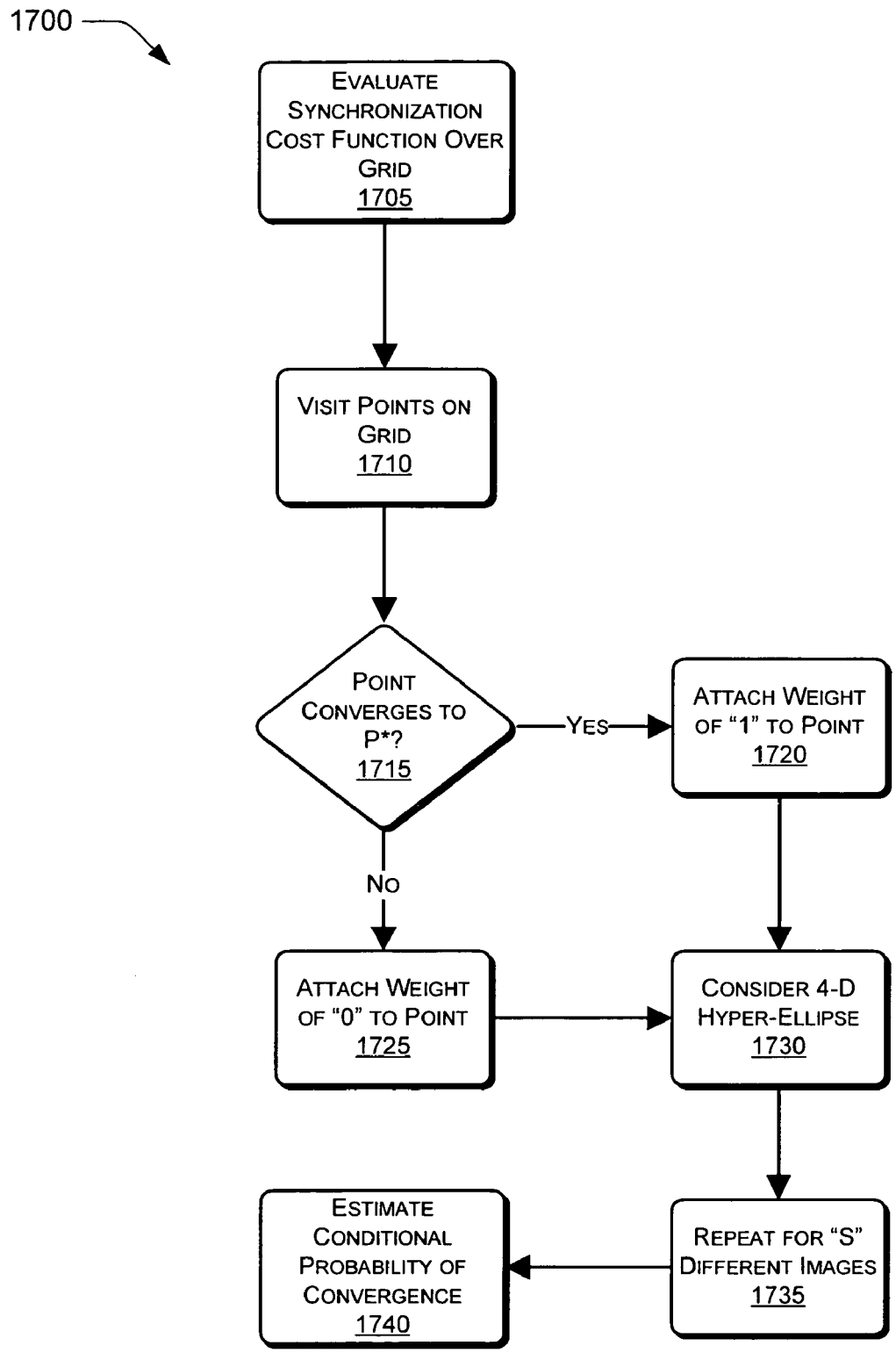
FIG. 17 is a flow diagram illustrating a process flow for estimating a conditional probability that the synchronization cost function D(p) converges at a given point, given an attack vector p having a set of radii $r_1$, $r_2$, $r_3$, and $r_4$.

FIG. 17 illustrates a process flow 1700 for estimating a conditional probability that the synchronization cost function D(p) converges at a given point, given an attack vector p having a set of radii $r_1$, $r_2$, $r_3$, and $r_4$. Given an image $I_k$, block 1705 can generate evaluations of D(p) over a 4-D grid of attack parameters, such that p* lies in the geometric center of the grid.

Block 1710 can visit each point in the grid, and block 1715 can determine whether the points in the grid converge to p*. If the given point converges to p*, then block 1720 can attach a weight of "1" to that point. Otherwise, block 1725 can attach a weight of "0" to that point.

It is understood that blocks 1715, 1720, and/or 1725 can be performed for each point on the 4-D grid. However, for clarity, FIG. 17 omits representations of the branching, evaluation, and looping operations associated with repeating the foregoing for each of these points.

Block 1730 can consider a 4-D hyper-ellipse that is centered at p*, and has the radius $r_i$ in each of the attack parameter dimensions. Then, let $F(r_1, r_2, r_3, r_4)$ denote the number of points spanned by this hyper-ellipsoid in the 4-D grid. Let $f_k(r_1, r_2, r_3, r_4)$ be the number of points in the hyper-ellipse that converge, which is determined using the weights attached to the points in block 1720

Block 1735 generally represents repeating blocks 1710, 1715, 1720/1725, and 1730 for S different images. Once again, for clarity, FIG. 17 omits the branching and looping involved with each repetition for the S different images.

For a large enough S, block 1740 can estimate P(Convergence/$r_1$, $r_2$, $r_3$, $r_4$), which can be given as:

$$P(\text{Convergence}/r_1, r_2, r_3, r_4) = \frac{\sum_{k=1}^{S} f_k(r_1, r_2, r_3, r_4)}{S * F(r_1, r_2, r_3, r_4)}.$$

In particular, the maximum $\{r_i\}_{i=1}^4$, for which P(Convergence/$r_1$, $r_2$, $r_3$, $r_4$)≈1 can be termed, for convenience, as the "radii of convergence." Picking reasonable values of $\{r_i\}_{i=1}^4$ that allow a favorable balance between convergence probability and computational complexity enables this probability density function to be obtained. Once suitable $\{r_i\}_{i=1}^4$ are selected, $\{V_k\}_{k=1}^{N_{tot}}$ or equivalently $N_r$, $N_\theta$, $N_{m1}$, and $N_{m2}$ can be designed, such that the interval size in the i-th dimension (for $1 \leq i \leq 4$) is $$\approx 2r_i: N_r = \frac{2r_{max}}{2r_1}, N_\theta = \frac{2\theta_{max}}{2r_2}, Nm_1 = \frac{2m_{max}}{2r_3}, Nm2 = \frac{2m_{max}}{2r_4}.$$

Recall that the search algorithm complexity is proportional to $N_r \times N_\theta \times N_{m1} \times N_{m2}$. In terms of the radii $\{r_i\}_{i=1}^4$, the complexity varies with respect to $$\left(\prod_{i=1}^{4} r_i\right)^{-1}.$$

Accordingly, choosing a bigger radius decreases complexity of the search, but at the cost of decreasing the accuracy of the synchronization.

Exemplary Operating Environment

Having describing the tools in detail, the following discussion of an exemplary operating environment is provided to assist the reader in understanding one way in which various aspects of the tools may be employed. The environment described below constitutes but one example and is not intended to limit application of the tools to any one particular operating environment. Other environments may be used without departing from the spirit and scope of the claimed subject matter.

Figure 18:
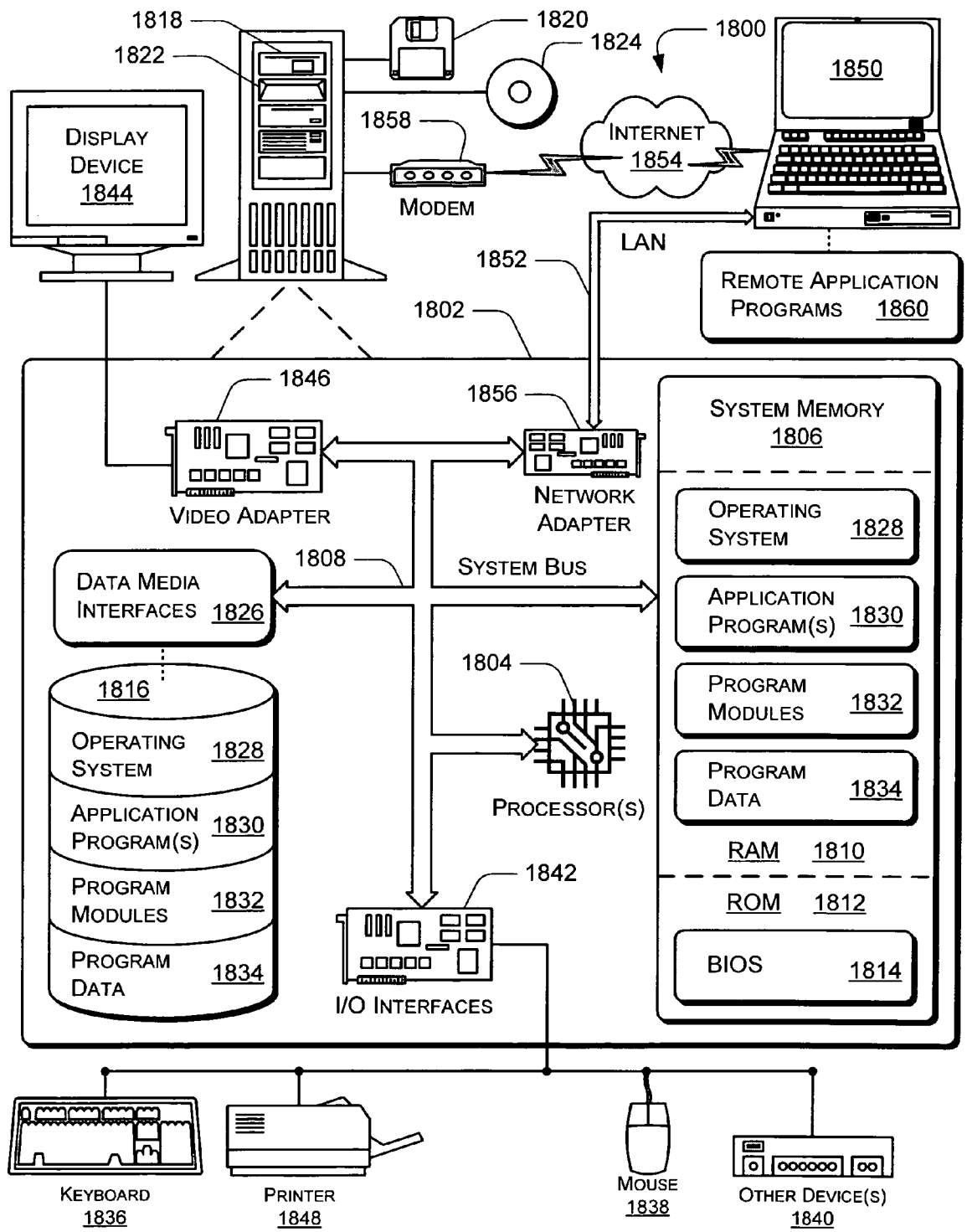
FIG. 18 illustrates an exemplary computing environment within which systems and methods for image fingerprinting using synchronization marks and watermarks, as well as the computing, network, and system architectures described herein, can be either fully or partially implemented.

FIG. 18 illustrates an exemplary operating or computing environment 1800 within which systems and methods for video fingerprinting using watermarks, as well as the computing, network, and system architectures described herein, can be either fully or partially implemented. For example, aspects of the computing environment 1800 may be suitable for implementing the embedder 110 and/or the receiver 130, as well as the components and processes thereof as described above. In addition, media players hosting embedder 110 and/or the receiver 130 may incorporate, at least in part, one or more aspects of the computing environment 1800.

Exemplary computing environment 1800 is only one example of a computing system and is not intended to suggest any limitation as to the scope of use or functionality of the architectures. Neither should the computing environment 1800 be interpreted as having any dependency or requirement relating to any one or combination of components illustrated in the exemplary computing environment 1800.

The computer and network architectures in computing environment 1800 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 1800 includes a general-purpose computing system in the form of a computing device 1802. The components of computing device 1802 can include, but are not limited to, one or more processors 1804 (e.g., any of microprocessors, controllers, and the like), a system memory 1806, and a system bus 1808 that couples the various system components. The one or more processors 1804 process various computer executable instructions to control the operation of computing device 1802 and to communicate with other electronic and computing devices. The system bus 1808 represents any number of several types of bus structures, including a memory bus or memory controller, a peripheral bus, an accelerated graphics port, and a processor or local bus using any of a variety of bus architectures.

Computing environment 1800 includes a variety of computer readable media which can be any media that is accessible by computing device 1802 and includes both volatile and non-volatile media, removable and non-removable media. The system memory 1806 includes computer readable media in the form of volatile memory, such as random access memory (RAM) 1810, and/or non-volatile memory, such as read only memory (ROM) 1812. A basic input/output system (BIOS) 1814 maintains the basic routines that facilitate information transfer between components within computing device 1802, such as during start-up, and is stored in ROM 1812. RAM 1810 typically contains data and/or program modules that are immediately accessible to and/or presently operated on by one or more of the processors 1804.

Computing device 1802 may include other removable/non-removable, volatile/non-volatile computer storage media. By way of example, a hard disk drive 1816 reads from and writes to a non-removable, non-volatile magnetic media (not shown), a magnetic disk drive 1818 reads from and writes to a removable, non-volatile magnetic disk 1820 (e.g., a "floppy disk"), and an optical disk drive 1822 reads from and/or writes to a removable, non-volatile optical disk 1824 such as a CD-ROM, digital versatile disk (DVD), or any other type of optical media. In this example, the hard disk drive 1816, magnetic disk drive 1818, and optical disk drive 1822 are each connected to the system bus 1808 by one or more data media interfaces 1826. The disk drives and associated computer readable media provide non-volatile storage of computer readable instructions, data structures, program modules, and other data for computing device 1802.

Any number of program modules can be stored on RAM 1810, ROM 1812, hard disk 1816, magnetic disk 1820, and/or optical disk 1824, including by way of example, an operating system 1828, one or more application programs 1830, other program modules 1832, and program data 1834. Each of such operating system 1828, application program(s) 1830, other program modules 1832, program data 1834, or any combination thereof, may include one or more embodiments of the systems and methods described herein. As an example only, the application programs 1830 can include media player software that is configured to perform the functions described above in connection with the embedder 110 and/or the receiver 130, or the components or processes thereof.

Computing device 1802 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example and not limitation, communication media includes wired media such as a wired network or direct-wired connection, and wireless media such as acoustic, RF, infrared, other wireless media, and/or any combination thereof.

A user can interface with computing device 1802 via any number of different input devices such as a keyboard 1836 and pointing device 1838 (e.g., a "mouse"). Other input devices 1840 (not shown specifically) may include a microphone, joystick, game pad, controller, satellite dish, serial port, scanner, and/or the like. These and other input devices are connected to the processors 1804 via input/output interfaces 1842 that are coupled to the system bus 1808, but may be connected by other interface and bus structures, such as a parallel port, game port, and/or a universal serial bus (USB).

A display device 1844 (or other type of monitor) can be connected to the system bus 1808 via an interface, such as a video adapter 1846. In addition to the display device 1844, other output peripheral devices can include components such as speakers (not shown) and a printer 1848 which can be connected to computing device 1802 via the input/output interfaces 1842.

Computing device 1802 can operate in a networked environment using logical connections to one or more remote computers, such as remote computing device 1850. By way of example, remote computing device 1850 can be a personal computer, portable computer, a server, a router, a network computer, a peer device or other common network node, and the like. The remote computing device 1850 is illustrated as a portable computer that can include any number and combination of the different components, elements, and features described herein relative to computing device 1802.

Logical connections between computing device 1802 and the remote computing device 1850 are depicted as a local area network (LAN) 1852 and a general wide area network (WAN) 1854. Such networking environments are commonplace in offices, enterprise-wide computer networks, intranets, and the Internet. When implemented in a LAN networking environment, the computing device 1802 is connected to a local network 1852 via a network interface or adapter 1856. When implemented in a WAN networking environment, the computing device 1802 typically includes a modem 1858 or other means for establishing communications over the wide area network 1854. The modem 1858 can be internal or external to computing device 1802, and can be connected to the system bus 1808 via the input/output interfaces 1842 or other appropriate mechanisms. The illustrated network connections are merely exemplary and other means of establishing communication link(s) between the computing devices 1802 and 1850 can be utilized.

In a networked environment, such as that illustrated with computing environment 1800, program modules depicted relative to the computing device 1802, or portions thereof, may be stored in a remote memory storage device. By way of example, remote application programs 1860 are maintained with a memory device of remote computing device 1850. For purposes of illustration, application programs and other executable program components, such as operating system 1828, are illustrated herein as discrete blocks, although it is recognized that such programs and components reside at various times in different storage components of the computing device 1802, and are executed by the one or more processors 1804 of the computing device 1802.

CONCLUSION

The above-described systems and methods enable digital fingerprinting using synchronization marks and watermarks. Although the system and method has been described in language specific to structural features and/or methodological acts, it is to be understood that the system and method defined in the appended claims is not necessarily limited to the specific features or acts described. Rather, the specific features and acts are disclosed as exemplary forms of implementing the claimed systems and methods.

It is further understood that the foregoing description discloses several process flows and/or related flow diagrams. It is understood that while these process flows may be described herein as being executed in connection with certain components, these process flows could readily be performed or executed in connection with other components without departing from the spirit and scope of the subject matter described herein. It is also noted that various sub-processes are disclosed herein as illustrative sub-components of broader processes. However, implementations of the broader processes need not include all of the illustrative components shown herein, and may include one or more of these illustrative components without departing from the spirit and scope of the subject matter described herein.

What is claimed is:

1. One or more computer readable storage media comprising computer executable instructions that, when executed, direct a computing device to:

divide an input signal into a plurality of regions;
generate respective hash values for the plurality of regions;
generate a plurality of random numbers for the plurality of regions;
compare the hash values for at least one of the plurality of regions to the random numbers;
synchronize at least a subset of the plurality of regions with further regions as defined by an embedder in producing the input signal; and
model a geometric distortion undergone by the input signal between the embedder and a receiver, wherein the geometric distortion is modeled by determining deviations between the hash values and the random numbers for the plurality of regions.

2. The computer readable storage media of claim 1, further comprising computer executable instructions that, when executed, direct the computing device to divide the input signal using a same secret key as was used by the embedder to divide a host signal as input to the embedder.

3. The computer readable storage media of claim 1, further comprising computer executable instructions that, when executed, direct the computing device to synchronize the regions using a blind synchronization process.

4. The computer readable storage media of claim 1, further comprising computer executable instructions that, when executed, direct the computing device to generate a plurality of random numbers using a same seed as used by the embedder in connection with producing the input signal.

5. The computer readable storage media of claim 1, further comprising computer executable instructions that, when executed, direct the computing device to select the subset of the regions based on the deviations.

6. The computer readable storage media of claim 1, further comprising computer executable instructions that, when executed, direct the computing device to sort the regions according to the deviations.

7. The computer readable storage media of claim 1, further comprising computer executable instructions that, when executed, direct the computing device to apply a model of the geometric distortion to at least one of the subset of regions, and to evaluate whether the model sufficiently reflects the geometric distortion.

8. A method of determining that a signal output by an embedder has undergone an attack or distortion and processing the signal to undo the attack or distortion, the method being implemented at a receiver and comprising:
receiving, at the receiver, the signal output from the embedder, wherein the embedder is configured to divide a host signal into a plurality of regions and embed marks into a subset of the plurality of regions of the host signal;
dividing, at the receiver, the signal into a plurality of regions using a same secret key as was used by the embedder when the embedder divided the host signal;
synchronizing, at the receiver, at least a subset of the regions with further regions defined by the embedder to obtain a new signal with the attack or distortion undone, the synchronizing comprising:
generating a hash value for each of the plurality of regions;
generating a random number for each of the plurality of regions using the same secret key as used by the embedder, wherein the hash value for one of the plurality of regions is designed to exactly match the random number for the same region in the signal output by the embedder;
determining a geometric distortion model based on the generated hash value and the random number for each of the plurality of regions, the determining comprising:
calculating deviations between the hash value for each of the plurality of the regions to the random number; and
selecting the geometric distortion model such that the hash value approximately matches the random number; and
applying an inverse of the geometric distortion model to the signal to produce the new signal with the attack or distortion undone; and
outputting the new signal from the receiver for further process or display.

* * * * *